United States Patent
Takabayashi et al.

(10) Patent No.: US 6,807,322 B2
(45) Date of Patent: Oct. 19, 2004

(54) PMD COMPENSATING APPARATUS FOR CONTROLLING POLARIZATION CONTROLLER BASED ON DETECTION OF MAGNITUDE OF WAVEFORM DISTORTION

(75) Inventors: Masakazu Takabayashi, Tokyo (JP); Sadayuki Matsumoto, Tokyo (JP); Kiichi Yoshiara, Tokyo (JP); Takuya Ohira, Tokyo (JP); Junichiro Hoshizaki, Tokyo (JP); Shigeru Matsuno, Tokyo (JP); Ryosuke Namiki, Tokyo (JP); Minoru Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/367,994

(22) Filed: Feb. 19, 2003

(65) Prior Publication Data
US 2003/0165284 A1 Sep. 4, 2003

(30) Foreign Application Priority Data

Feb. 19, 2002 (JP) .................................... P2002-041430
Oct. 30, 2002 (JP) .................................... P2002-316059

(51) Int. Cl.[7] ................................................ G02B 6/00
(52) U.S. Cl. .............................. 385/11; 385/27; 385/37
(58) Field of Search .............................. 385/11, 27, 37

(56) References Cited

U.S. PATENT DOCUMENTS 5,930,414 A    7/1999 Fishman et al.
5,995,228 A  * 11/1999 Otani et al. .................. 356/364
6,271,952 B1    8/2001 Epworth
6,452,720 B1  *  9/2002 Naganuma et al. .... 359/341.31

FOREIGN PATENT DOCUMENTS

| JP | 6-51145 | 2/1994 |
| JP | 11-196046 | 7/1999 |
| JP | 2001-21848 | 1/2001 |
| JP | 2001-42272 | 2/2001 |
| WO | WO 03/003104 | 1/2003 |

OTHER PUBLICATIONS

Lee, S. et al.; "Adjustable Compensation of Polarization Mode Dispersion Using a High-Birefringence Nonlinearly Chirped Fiber Bragg Grating", *IEEE Photonics Tech. Letters*, vol. 11, No. 10, pp. 1277–1279 (Oct. 1999).

* cited by examiner

*Primary Examiner*—Michael G. Lee
*Assistant Examiner*—Seung H Lee
(74) *Attorney, Agent, or Firm*—Leydig, Voit & Mayer, Ltd.

(57) ABSTRACT

In a polarization mode dispersion compensating apparatus for controlling polarization mode dispersion of an optical signal, a first optical monitor detects and outputs, based on an optical signal outputted from a first optical transmission line having a grating, a first detection signal indicating magnitude of waveform distortion of the first optical transmission line, and a second optical monitor detects and outputs, based on an optical signal output from a second optical transmission line having a grating, a second detection signal indicating magnitude of waveform distortion of the second optical transmission line. A calculator circuit calculates from the first and second detection signals an output signal. A controller controls a polarization controller based on the output signal from the calculator circuit.

20 Claims, 29 Drawing Sheets

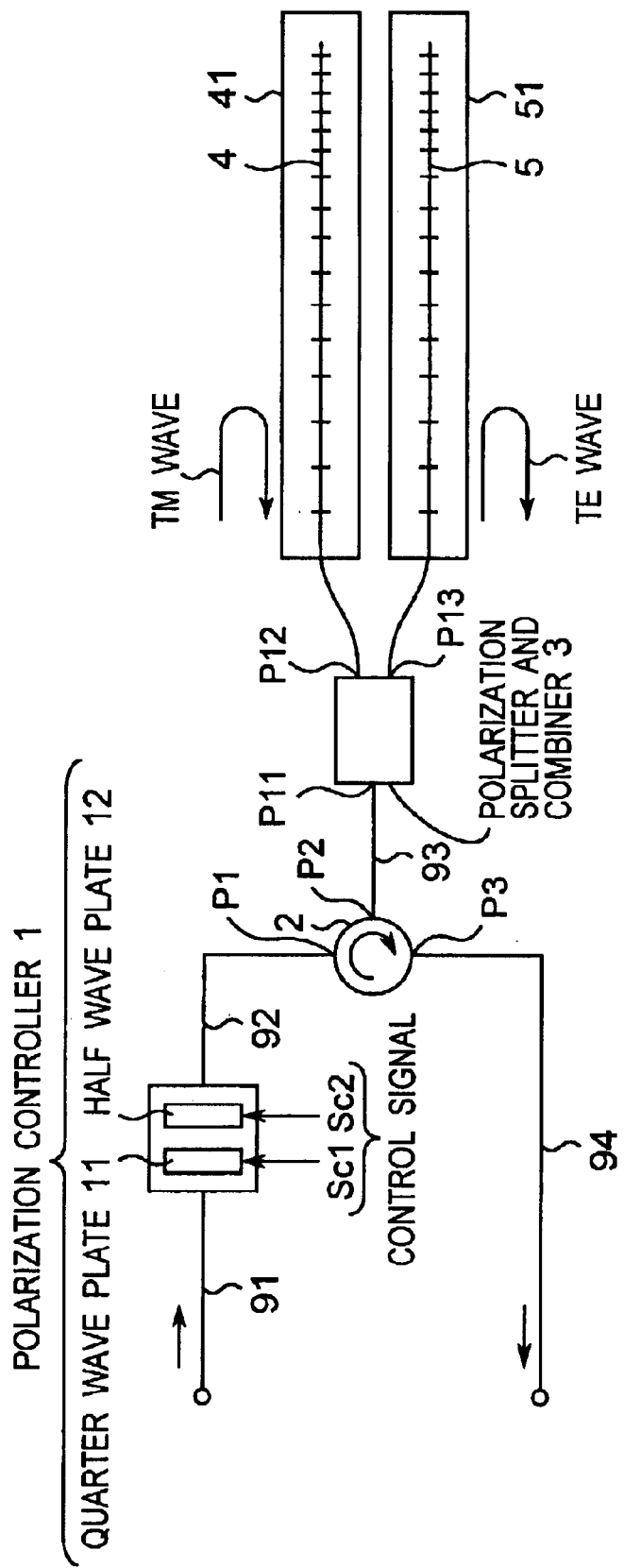

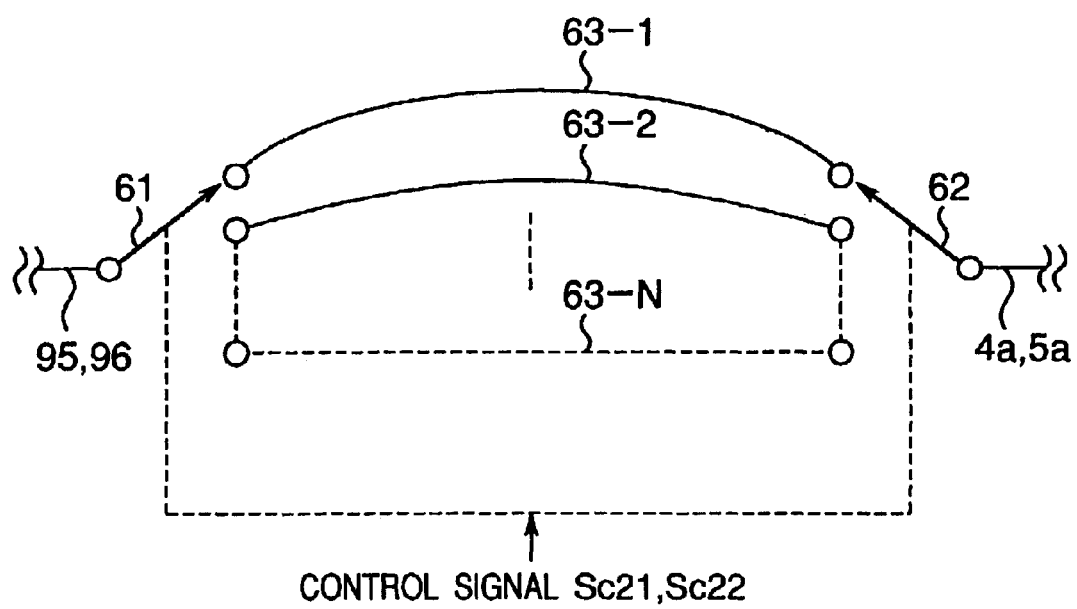

MODIFIED PREFERRED EMBODIMENT OF SECOND PREFERRED EMBODIMENT
PMD COMPENSATING APPARATUS 102a

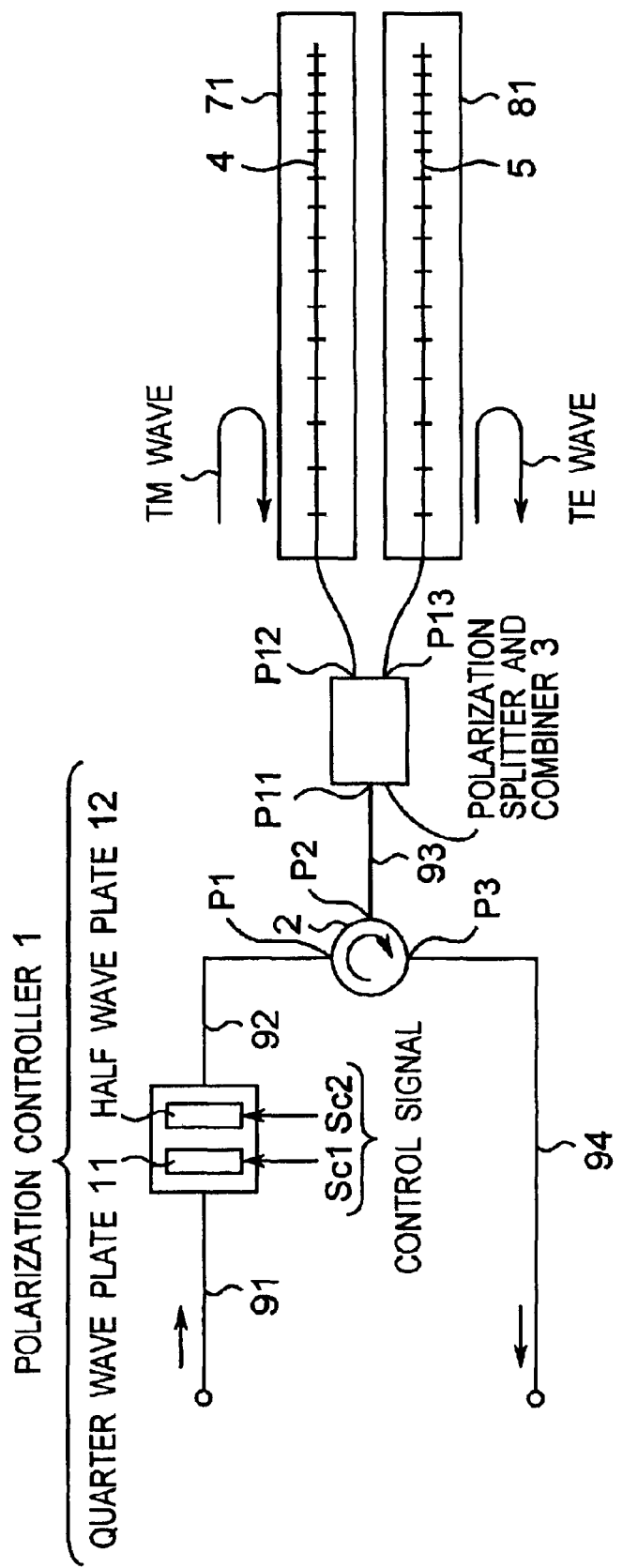

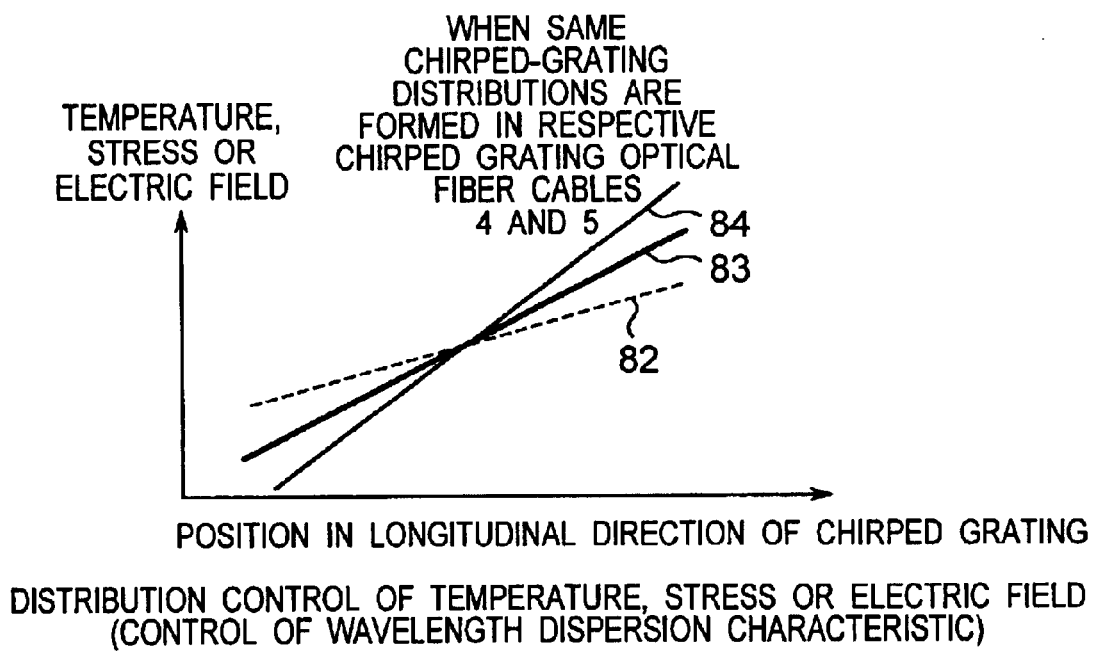

CHANGE IN CHIRPING RATE OF CHIRPED GRATING

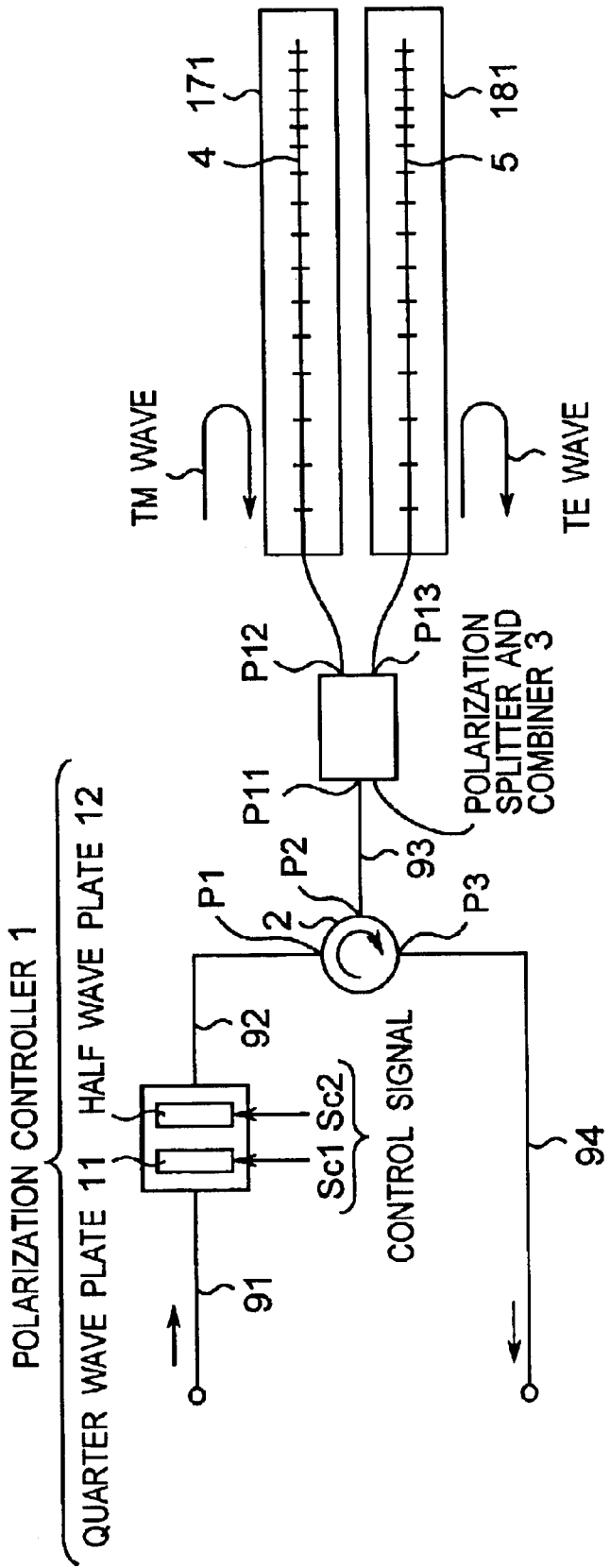
Fig.12 FOURTH PREFERRED EMBODIMENT
PMD COMPENSATING APPARATUS 104

CONTROL OF PMD WAVELENGTH DEPENDENCE

OPTICAL SIGNAL MONITOR 111,112,115,141,142

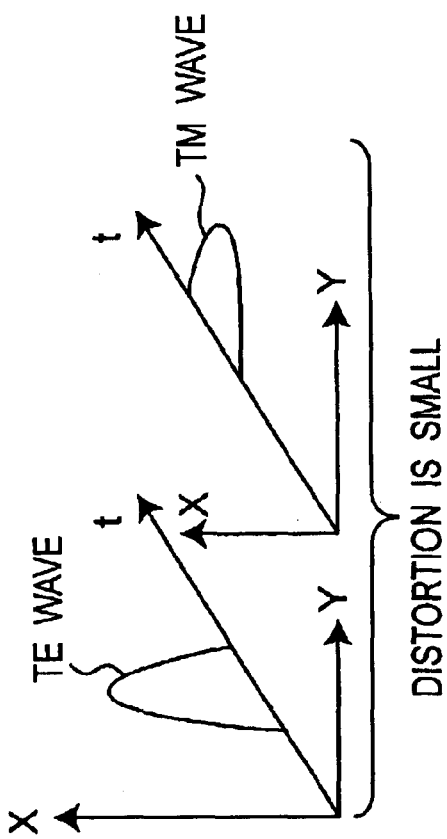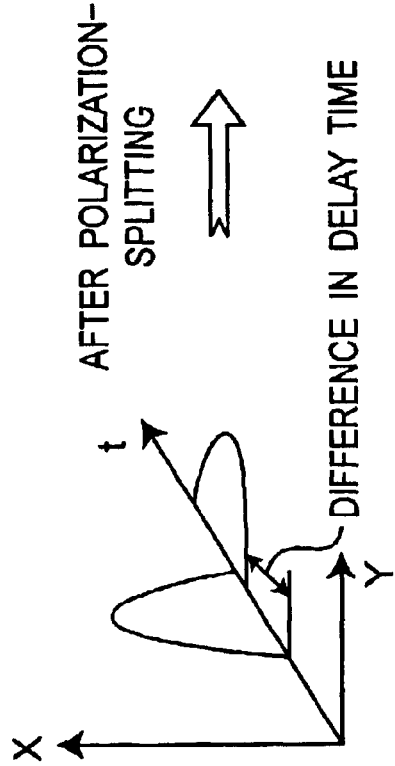

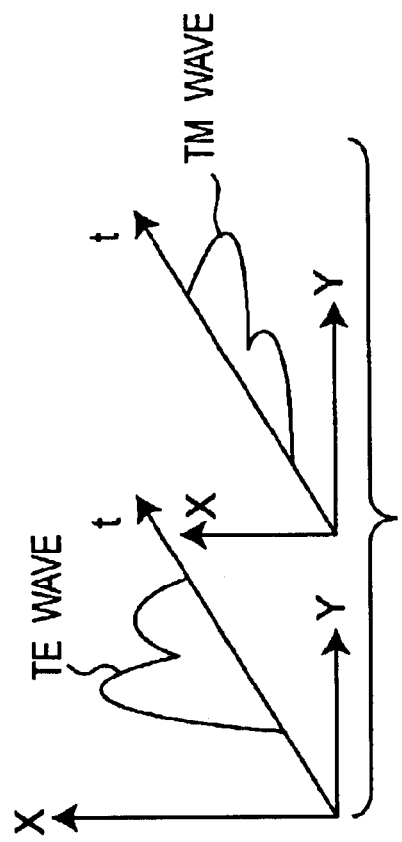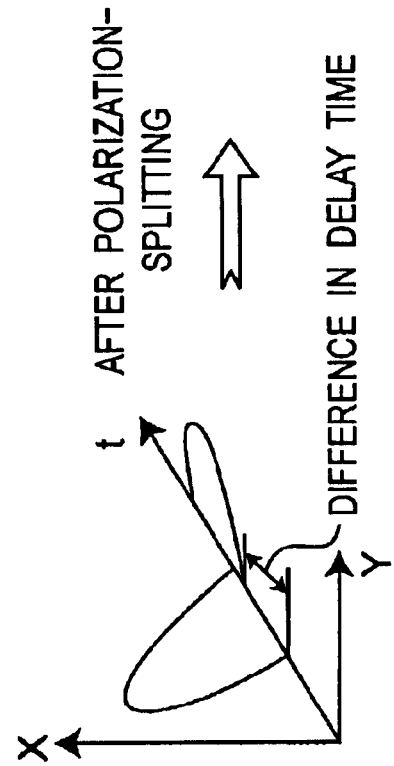

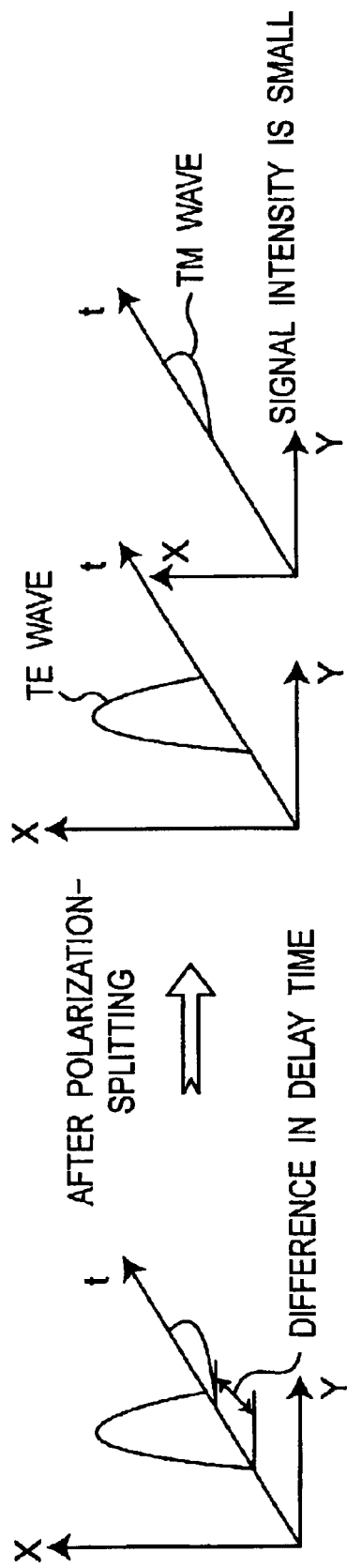

SIXTH PREFERRED EMBODIMENT
PMD COMPENSATING APPARATUS 106

Fig.26 EIGHTH PREFERRED EMBODIMENT
PMD COMPENSATING APPARATUS 108

NINTH PREFERED EMBODIMENT
PMD COMPENSATING APPARATUS 109

GENERATION OF POLARIZATION MODE DISPERSION
IN OPTICAL FIBER CABLE 200 FOR TRANSMISSION

PMD COMPENSATING APPARATUS

PMD COMPENSATING APPARATUS FOR CONTROLLING POLARIZATION CONTROLLER BASED ON DETECTION OF MAGNITUDE OF WAVEFORM DISTORTION

BACKGROUND OF THE INVENTION

1. Field of the Invention

The present invention relates to a polarization mode dispersion compensating apparatus (referred to as a PMD compensating apparatus hereinafter), and in particular, to a PMD compensating apparatus for compensating polarization mode dispersion of optical transmission lines which may become limitation factors for transmission rate and transmission distance in, for example, ultrahigh-speed optical communication systems.

2. Description of the Related Art

Recently, with a demand for higher transmission speeds for optical communication systems, there has been developed and practically used ultrahigh-speed optical communication systems of, for example, 40 Gbps or higher.

In optical fiber cables of such 40 Gbps or higher ultrahigh-speed optical communication systems, relatively large polarization dispersion may be caused which would be a cause of limitations on transmission rate or transmission distance. This polarization dispersion is caused as follows. Degeneracy of the base mode is resolved due to decentering of a core of an optical fiber cable 200 for transmission or due to application of non-axisymmetric stress to the core, so that a difference in propagation velocity between optical signals of two polarized wave components of TE and TM waves perpendicular to each other leads to a group delay time difference between TE and TM waves. As shown in FIG. 28, a group delay time difference is caused between TE and TM waves. As a result, the optical pulse signal spreads in the temporal axis direction, and this leads to limitation of the transmission rate and transmission distance in the communication systems.

In order to solve such problems, there is required a method of, at a receiving terminal, controlling the state of polarization and generating a group delay time difference inverse to that of the optical transmission line of the optical fiber cable 200 for transmission, thereby compensating the group delay time difference. Also, since this polarization mode dispersion of the optical transmission line changes due to change of environments, it is necessary to control the compensation amount according to environmental variations. Further, in the ultrahigh-speed optical communication systems, wavelength dependence of wavelength dispersion or polarization mode dispersion become problems, in addition to the polarization mode dispersion, and it is necessary to compensate them.

FIG. 29 is a block diagram showing a configuration of a PMD compensating apparatus equipped with a movable mirror 203 according to a prior art, as disclosed in Japanese Patent Laid-Open Publication No. 11-196046.

Referring to FIG. 29, in this PMD compensating apparatus, an inputted optical signal is split into a TM wave and a TE wave by a polarization splitter 201, and then, movement of the movable mirror 203 between positions 203a and 203b in a direction of an arrow 203c can control the delay amount of the TE wave. As a result of this, such an adjustment is achieved that the group delay time difference between the TE wave and the TM wave is substantially minimized, and then, the adjusted TM wave and the TE wave are combined again by a polarization combiner 202. Thus, the combined optical signal is outputted.

In the PMD compensating apparatus shown in FIG. 29, the inclusion of movable parts such as the movable mirror 203 causes mechanical deterioration, which leads to operational faults or the like, and this leads to such a problem that good reliability cannot be obtained. Also, this PMD compensating apparatus has another problem that it can control polarization mode dispersion but not wavelength dispersion or wavelength dependence of the polarization mode dispersion.

In order to solve the above problems, FIG. 2 of a second prior art document of the U.S. Pat. No. 6,271,952 shows a PMD compensating apparatus equipped with a differential delay system 1019 and an optical recombiner 1022 as shown in FIG. 30, and the following operation.

In order to solve the above problems, FIG. 2 of a second prior art document of the U.S. Pat. No. 6,271,952 shows a PMD compensating apparatus equipped with a differential delay system 1019 and an optical recombiner 1022 as shown in FIG. 30, and following operation is disclosed in the second prior art document.

More particularly, based on a control signal from a controller 1010, an optical signal whose polarization state is controlled by a polarization controller 1007 is split into a TM wave and a TE wave by a polarized beam splitter 1008. The split TE wave and TM wave are each outputted to the differential delay system 1019, while at the same time they are detected by detectors 1015 and 1016 and converted into electric signals, which are outputted to a dispersion measurement circuit 1017. The differential delay system 1019 applies continuous variable differential delay amount T to each of the inputted TE wave and TM wave, and outputs these two polarized waves to the optical recombiner 1022 for recombining these. The dispersion measurement circuit 1017 measures the time difference t between the split TE and TM waves, and controls the control signal to the controller 1010 so as to be the maximum based on the result of the measurement. The controller 1010 outputs a control signal 1024, which depends on the magnitude of time difference t and influences the continuous variable differential delay amount T, to the differential delay system 1019. In response to the control signal 1024, the differential delay system 1019 controls the inputted TE wave and TM wave so as to be T=t, and outputs them to the optical recombiner 1022.

In the PMD compensating apparatus of FIG. 30, the time difference t between respective optical signals split by the polarized beam splitter 1008 is measured, and by using the result of the measurement, both the polarization controller 1007 and the differential delay system 1019 are controlled, so that the control processing becomes quite difficult, and the response speed also becomes slow. Further, although polarization mode dispersion of the optical signal can be controlled, wavelength dependence of wavelength dispersion or polarization mode dispersion can not be controlled.

SUMMARY OF THE INVENTION

An essential object of the present invention is to provide a PMD compensating apparatus which solves the above-described problems and which is capable of controlling the polarization controller and the like reliably at a higher speed as compared with the prior art.

In addition to the above-mentioned object, another object of the present invention is to provide a PMD compensating apparatus which is capable of controlling the wavelength dispersion and the wavelength dependence of polarization mode dispersion.

According to one aspect of the present invention, a PMD compensating apparatus is equipped with a polarization control means, a polarization splitting and combining means, a first optical transmission line, a second optical transmission line, a first detection means, a second detection means, a first calculation means, and a first control means. The polarization control means controls a polarization state of an inputted optical signal so that a polarization axis of the optical signal becomes substantially coincident with an optical axis of an optical transmission line. The polarization splitting and combining means has first, second and third ports, and splits an optical signal outputted from the polarization control means and inputted via the first port, into optical signals of two polarized wave components substantially perpendicular to each other, and outputs the split optical signals respectively via the second and third ports. The polarization splitting and combining means further combines the two optical signals inputted via the second and third ports, and outputs a combined signal via the first port.

The first optical transmission line has a predetermined first grating, and reflects by the first grating and outputs one optical signal outputted from the second port of the polarization splitting and combining means. The second optical transmission line has a predetermined second grating, and reflects by the second grating and outputs the other optical signal outputted from the third port of the polarization splitting and combining means. The first detection means is connected to the first optical transmission line, and detects and outputs, based on an inputted optical signal outputted from the first optical transmission line, a first detection signal indicating magnitude of waveform distortion of the optical signal inputted to the first detection means. The second detection means is connected to the second optical transmission line, and detects and outputs, based on an inputted optical signal outputted from the second optical transmission line, a second detection signal indicating magnitude of waveform distortion of the optical signal inputted to the second detection means.

The first calculation means performs a predetermined calculation about the first detection signal and the second detection signal, and outputs an output signal indicating a result of the calculation. The first control means controls the polarization control means based on the output signal from the first calculation means.

According to another aspect of the present invention, a PMD compensating apparatus is equipped with a polarization control means, a polarization splitting and combining means, a first optical transmission line, a second optical transmission line and a fifth control means. The polarization control means controls a polarization state of an inputted optical signal so that a polarization axis of the optical signal becomes substantially coincident with an optical axis of an optical transmission line. The polarization splitting and combining means has first, second and third ports, splits an optical signal outputted from the polarization control means and inputted via the first port, into optical signals of two polarized wave components substantially perpendicular to each other, and outputs the split optical signals respectively via the second and third ports. The polarization splitting and combining means further combines two optical signals inputted via the second and third ports, and outputting a combined optical signal via the first port.

The first optical transmission line has a predetermined first grating, reflects by the first grating and outputs one optical signal outputted from the second port of the polarization splitting and combining means. The second optical transmission line has a predetermined second grating, and reflects by the second grating and outputs, the other optical signal outputted from the third port of the polarization splitting and combining means. The fifth control means is provided on at least one of the first transmission line and the second transmission line, and controls a group delay time difference between the optical signals of the two polarized wave components substantially perpendicular to each other by performing a predetermined processing for an optical signal transmitted on at least one of the first transmission line and the second transmission line.

The fifth control means includes at least one of the first, second and third still further control means. The first still further control means is provided in at least one of the first and second gratings, and controls a distribution of temperature of at least one of the first and second optical transmission lines in longitudinal directions of the first and second gratings. The second still further control means is provided in at least one of the first and second gratings, and controls a distribution of stress applied to at least one of the first and second optical transmission lines in longitudinal directions of the first and second gratings. The third still further control means is provided in at least one of the first and second gratings, and controls a distribution of electric field applied to at least one of the first and second optical transmission lines in longitudinal directions of the first and second gratings.

BRIEF DESCRIPTION OF THE DRAWINGS

FIG. 1 is a block diagram showing a configuration of a PMD compensating apparatus 101 of a first preferred embodiment according to the present invention;

FIG. 5 is a block diagram showing a configuration of optical delay controllers 6 and 7 of FIG. 4;

FIG. 8 is a block diagram showing a configuration of a PMD compensating apparatus 103 of a third preferred embodiment according to the present invention;

FIG. 10 is a graph showing distribution control of temperature, stress or electric field with respect to the position in the longitudinal direction of the chirped grating when the same grating distributions are formed in the chirped gratings of the optical fiber cables 4 and 5 of FIG. 8, respectively;

FIG. 12 is a block diagram showing a configuration of a PMD compensating apparatus 104 of a fourth preferred embodiment according to the present invention;

FIGS. 21A, 21B and 21C are timing charts showing optical signals when the polarization controller 1 is optimally controlled, in which FIG. 21A shows a time waveform of an optical signal before being polarization-split by the polarization splitter and combiner 3, FIG. 21B shows a time waveform of an optical signal of a TE wave that is polarization-split by the polarization splitter and combiner 3, and FIG. 21C shows a time waveform of an optical signal of a TM wave that is polarization-slit by the polarization splitter and combiner 3;

FIGS. 22A, 22B and 22C are timing charts showing optical signals when the polarization controller 1 is not optimally controlled, in which FIG. 22A shows a time waveform of an optical signal before being polarization-split by the polarization splitter and combiner 3, FIG. 22B shows a time waveform of an optical signal of a TE wave that has been polarization-split by the polarization splitter and combiner 3, and FIG. 22C shows a time waveform of an optical signal of a TM wave that has been polarization-slit by the polarization splitter and combiner 3;

FIGS. 23A, 23B and 23C are timing charts showing optical signals when a TM wave of respective polarized waves of an optical signal is small, in which FIG. 23A shows a time waveform of an optical signal before being polarization-split by the polarization splitter and combiner 3, FIG. 23B shows a time waveform of an optical signal of a TE wave that has been polarization-split by the polarization splitter and combiner 3, and FIG. 23C shows a time waveform of an optical signal of a TM wave that has been polarization-slit by the polarization splitter and combiner 3;

DETAILED DESCRIPTION OF THE PREFERRED EMBODIMENTS

Figure 2A:
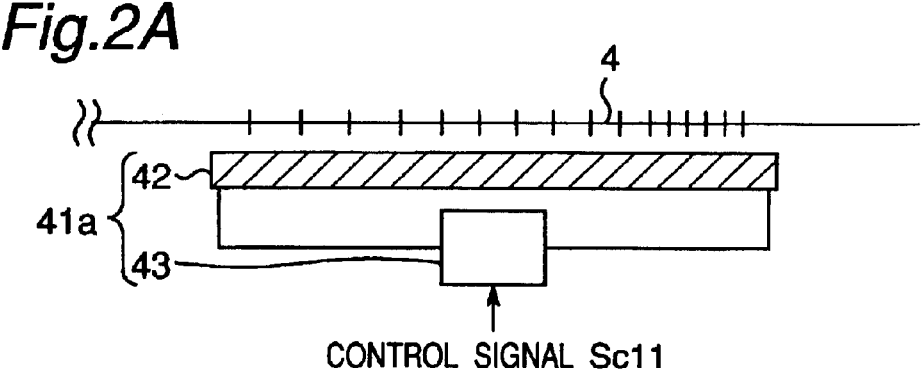
FIG. 2A is a schematic block diagram showing a configuration of a first implemental example 41a of a center wavelength control unit 41 provided on an optical fiber cable 4 having a chirped grating of FIG. 1.

Preferred embodiments according to the present invention will be described below with reference to the attached drawings.

First Preferred Embodiment

FIG. 1 is a block diagram showing a configuration of a PMD compensating apparatus 101 of a first preferred embodiment according to the present invention.

Referring to FIG. 1, the PMD compensating apparatus 101 according to the present preferred embodiment includes a polarization controller 1, an optical circulator 2, a polarization splitter and combiner 3, two optical fiber cables 4 and 5 each having a chirped grating, and center wavelength control units 41 and 51 provided on the optical fiber cables 4 and 5, respectively. The PMD compensating apparatus 101 is characterized in that the PMD of an optical signal inputted to the PMD compensating apparatus 101 is compensated by controlling the center wavelength of the wavelength band of the optical signal reflected by the chirped grating.

Referring to FIG. 1, an optical signal inputted to the PMD compensating apparatus 101 is inputted via an optical fiber cable 91 to the polarization controller 1 which has been known to those skilled in the art. The polarization controller 1 is constituted by a quarter wave plate 11 and a half wave plate 12, and in the polarization controller 1, the rotational angle of polarization of each of optical signals propagating through the wave plates 11 and 12 is adjusted by adjusting the levels of a control signal Sc1 applied to the quarter wave plate 11 and a control signal Sc2 applied to the half wave plate 12. This leads to that the polarization states of the optical signal are controlled so that the polarization axis of the optical signal propagating through the input-side optical fiber cable 91 becomes substantially coincident with the optical axis of an output-side optical fiber cable 92. Then, an optical signal outputted from the polarization controller 1 is inputted through the optical fiber cable 92 to a first port P1 of the optical circulator 2 having three ports P1, P2 and P3, and then, the inputted optical signal is outputted from the second port P2. This optical signal is inputted through an optical fiber cable 93 to the polarization splitter and combiner 3 having three ports P11, P12 and P13 via the first port P1. The polarization splitter and combiner 3 splits the inputted optical signal into TM and TE waves, and outputs split TM and TE waves.

Among the split optical signals, an optical signal of the TM wave outputted from the second port P12 of the polarization splitter and combiner 3 is inputted to an optical fiber cable 4, which is connected with the second port P12 of the polarization splitter and combiner 3 and which is equipped with the center wavelength control unit 41 and further has a chirped grating. Thereafter, a predetermined wavelength band component of the inputted optical signal is reflected by the chirped grating, and the reflected optical signal is returned to the second port P12 of the polarization splitter and combiner 3. On the other hand, an optical signal of the TE wave outputted from the third port P13 of the polarization splitter and combiner 3 is inputted to an optical fiber cable 5 which is connected with the third port P13 of the polarization splitter and combiner 3 and which is equipped with the center wavelength control unit 51 and further has a chirped grating. Thereafter, a predetermined wavelength band component of the inputted optical signal is reflected by the chirped grating, and is returned to the third port P13 of the polarization splitter and combiner 3. The optical signals of the TM and TE waves returned to the polarization splitter and combiner 3 are combined together by the polarization splitter and combiner 3. The combined optical signal is inputted to the second port P2 of the optical circulator 2 from the first port P11 through an optical fiber cable 93, and then, the inputted optical signal is outputted from the third port P3 thereof, then is further outputted from the PMD compensating apparatus 101 through an optical fiber cable 94.

Figure 3A:
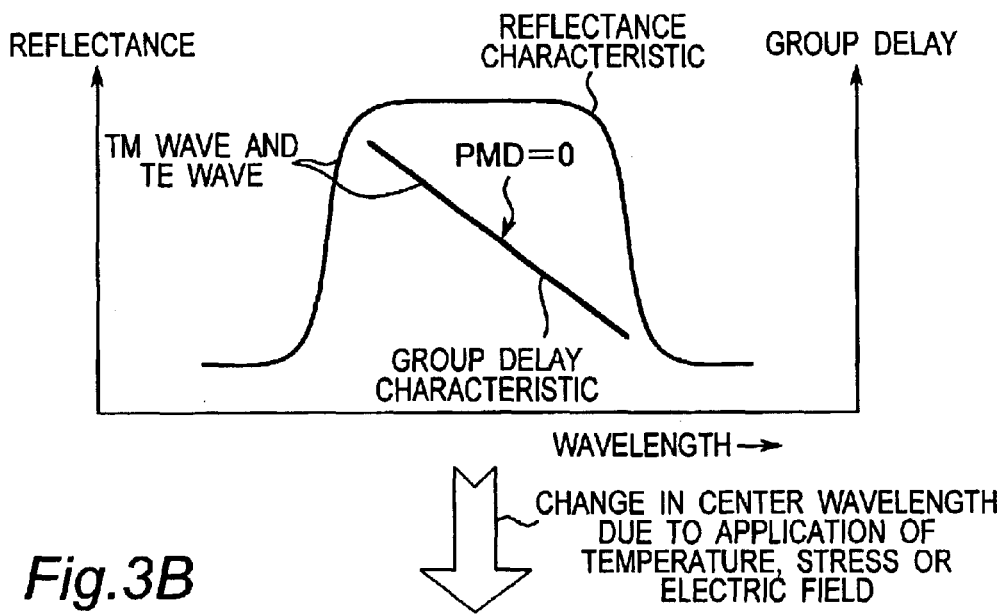
FIG. 3A is a graph showing a reflectance characteristic and a group delay characteristic of the PMD compensating apparatus 101 of FIG. 1 with a polarization mode dispersion PMD=0.

The optical fiber cable 4 is formed so as to have a chirped grating so that applying ultraviolet rays via a chirped mask which has been skilled in the art to an optical fiber cable having no grating causes the refractive index thereof to change with respect to the longitudinal direction thereof according to a predetermined function. The optical fiber cable 5 is also formed so as to have a chirped grating in a manner substantially similar to that of the optical fiber cable 4. In this case, the chirped grating is formed such that the grating period or pitch changes with respect to the longitudinal direction of the optical fiber cables 4 and 5, for example, as shown in FIG. 1, and in this case, the reflection wavelength λ of the grating can be expressed by the following equation:

$$\lambda = 2n\Lambda \quad (1),$$

where n is a refractive index and Λ is a grating period. When the grating period Λ changes, the reflection wavelength changes depending on the longitudinal position of the chirped grating. Therefore, the group delay time changes depending on the wavelength, so that the group delay wavelength characteristic of the optical fiber cables 4 and 5 each having a chirped grating includes an inclined characteristic as shown in FIG. 3A.

FIG. 2A is a schematic block diagram showing a configuration of a first implemental example 41a of the center wavelength control unit 41 provided on the optical fiber cable 4 having the chirped grating of FIG. 1.

Referring to FIG. 2A, a heater 42 for temperature control is provided along the longitudinal direction of the optical fiber cable 4 so as to be thermally coupled with the optical fiber cable 4, and a control voltage generator 43 for supplying a predetermined operating voltage is connected with the heater 42 for temperature control. According to an inputted control signal Sc11, the control voltage generator 43 controls the operating voltage to be applied to the heater 42 for temperature control, and this leads to control of the temperature of the optical fiber cable 4 having the chirped grating. That is, the refractive index n of the optical fiber cable 4 is changed by changing the temperature of the optical fiber cable 4 by the thermooptic effect which has been known to those skilled in the art, thus making it possible to change the center wavelength of the wavelength band of the optical signal reflected by the chirped grating as apparent from the Equation (1).

Figure 2B:
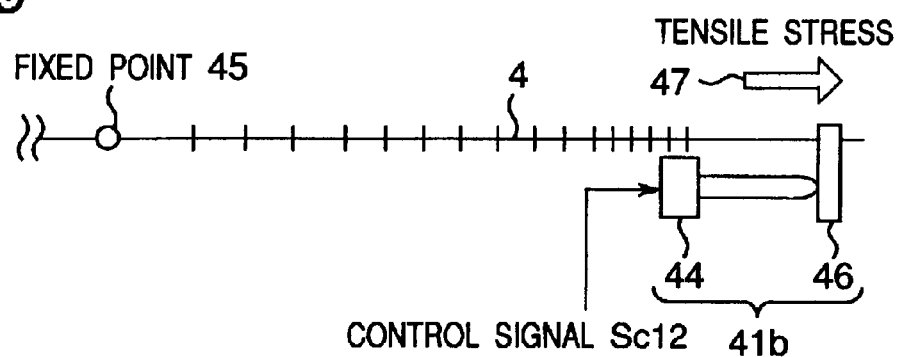
FIG. 2B is a schematic block diagram showing a configuration of a second implemental example 41b of the center wavelength control unit 41 provided on the optical fiber cable 4 having the chirped grating of FIG. 1.

FIG. 2B is a schematic block diagram showing a configuration of a second implemental example 41b of the center wavelength control unit 41 provided on the optical fiber cable 4 having the chirped grating of FIG. 1.

Referring to FIG. 2B, an end portion of the optical fiber cable 4 on the left side in the figure is fixed at a fixed point 45, while an end portion of the optical fiber cable 4 on the right side in the figure is coupled with a support bar 46. An actuator 44 for stress control pulls the support bar 46 in a direction parallel to the longitudinal direction of the optical fiber cable 4 and toward the right-side terminal end portion thereof (in a direction shown by an arrow 47) according to an inputted control signal Sc12, then applying the tensile stress in the direction to the optical fiber cable 4. By controlling the tensile stress according to the control signal Sc12, the actuator 44 for stress control physically changes the grating position of the optical fiber cable 4 having a chirped grating, and this leads to change of the grating period A of the optical fiber cable 4, thus making it possible to change the center wavelength of the wavelength band of the optical signal reflected by the chirped grating as apparent from the Equation (1).

Figure 2C:
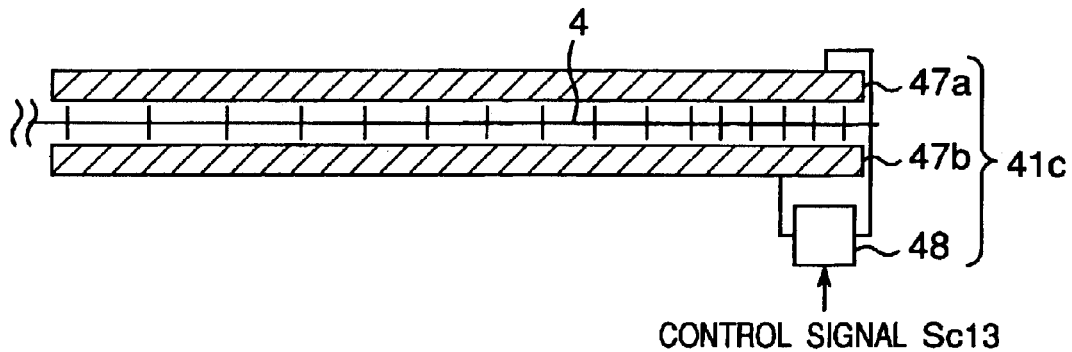
FIG. 2C is a schematic block diagram showing a configuration of a third implemental example 41c of the center wavelength control unit 41 provided on the optical fiber cable 4 having the chirped grating of FIG. 1.

FIG. 2C is a schematic block diagram showing a configuration of a third implemental example 41c of the center wavelength control unit 41 provided on the optical fiber cable 4 having the chirped grating of FIG. 1.

Referring to FIG. 2C, a pair of electrodes 47a and 47b for electric field control are provided on both sides of the optical fiber cable 4 along the longitudinal direction thereof so that a predetermined electric field can be applied to the optical fiber cable 4, and a control voltage generator 48 for supplying a predetermined operating voltage is connected with the electrodes 47a and 47b for electric field control. According to an inputted control signal Sc13, the control voltage generator 48 controls the operating voltage to be applied to the electrodes 47a and 47b for electric field control, and this leads to control of the electric field applied to the optical fiber cable 4 having a chirped grating. That is, the refractive index n of the optical fiber cable 4 is changed by changing the electric field applied to the optical fiber cable 4 by the electrooptic effect which has been known to those skilled in the art, thus making it possible to change the center wavelength of the wavelength band of the optical signal reflected by the chirped grating as apparent from the Equation (1).

It is noted that also in the optical fiber cable 5, in a manner similar to that of the optical fiber cable 4, a center wavelength control unit 51 having the same constitution as that of the center wavelength control unit 41a, 41b and 41c is provided.

Figure 3B:
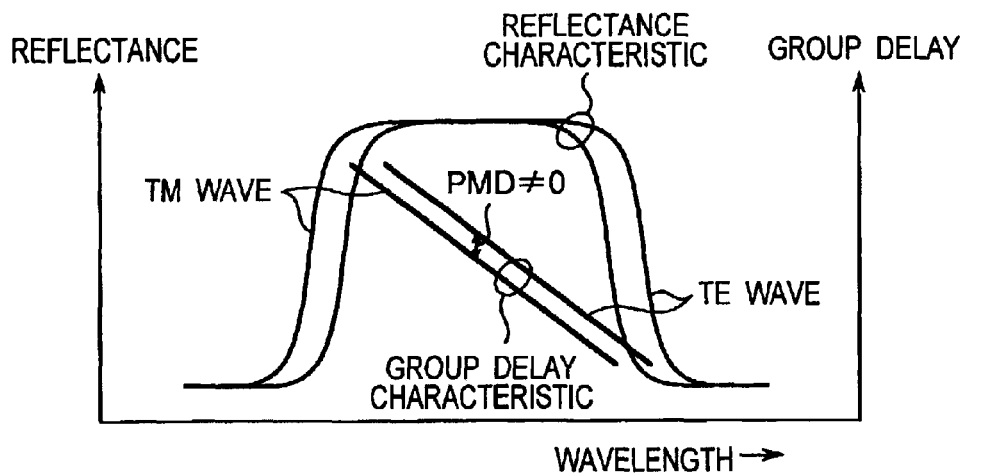
FIG. 3B is a graph showing a reflectance characteristic and a group delay characteristic of the PMD compensating apparatus 101 of FIG. 1 with a polarization mode dispersion PMD≠0, and with the center wavelength of the chirped grating changed from the characteristic of FIG. 3A by the center wavelength control unit 41.

By the way, the chirped gratings of the two optical fiber cables 4 and 5 are so formed as to have reflectance characteristics or group delay characteristics which are substantially similar to each other before the operation of the center wavelength control unit 41, and therefore, the reflectance characteristics and the group delay characteristics of the TM and TE waves overlap on each other as shown in FIG. 3A. However, for example, when the center wavelength of the wavelength band of an optical signal reflected by one chirped grating is shifted by the center wavelength control unit 41 shown in FIG. 2A, 2B or 2C, there arises a significant difference in the reflectance characteristic or the group delay characteristic between the TM and TE waves as shown in FIG. 3B, and this leads to occurrence of a polarization mode dispersion, which represents a difference in group delay characteristic between the TM and TE waves. Therefore, the PMD substantially proportional to the temperature, stress or electric field applied by the center wavelength control unit 41a, 41b or 41c can be generated, and this leads to that the PMD can be controlled.

In the above description, it has been assumed that the chirped gratings of the two optical fiber cables 4 and 5 are so formed as to have the reflectance characteristics or the group delay characteristics similar to each other before the operation of the center wavelength control unit 41. However, there can be used chirped gratings of the two optical fiber cables 4 and 5 having mutually different center wavelengths of the wavelength band of the optical signal which is reflected. In this case, the PMD value is not zero, however, is a predetermined value. In order to make the PMD value zero, it is appropriate to control the temperature, stress or electric field so that the center wavelengths of the wavelength band of the optical signals reflected by the chirped gratings of the two optical fiber cables 4 and 5, respectively, become substantially equal to each other.

In the above-mentioned preferred embodiment, the two optical fiber cables 4 and 5 have the center wavelength control units 41 and 51, respectively. However, it is can be constituted such that at least one optical fiber cable 4 or 5 includes the center wavelength control unit 41 or 51.

In the above-mentioned preferred embodiment, since the PMD can be controlled by controlling the center wavelength of the wavelength band of the optical signal reflected by the chirped grating, it becomes possible to achieve such a compensation that the PMD of optical transmission lines such as optical fiber cables becomes substantially zero.

Figure 29:
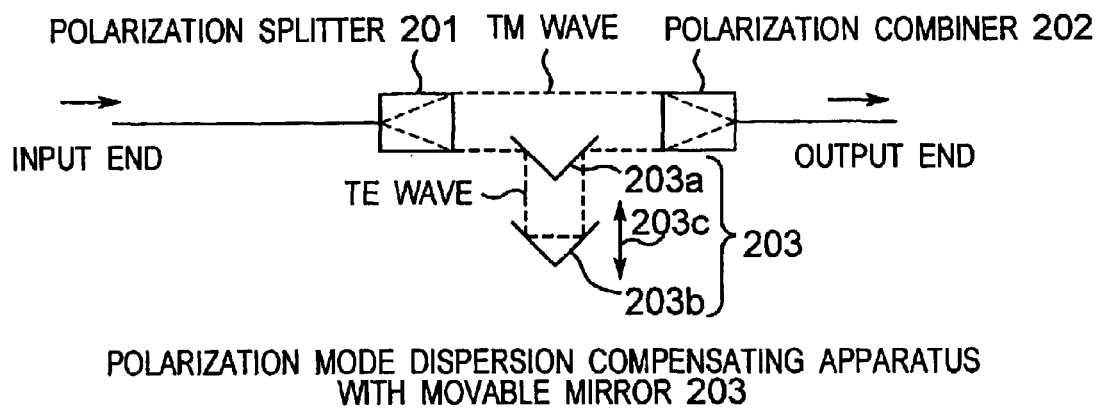
FIG. 29 is a block diagram showing a configuration of a PMD compensating apparatus using a movable mirror 203 according to a prior art.
Figure 30:
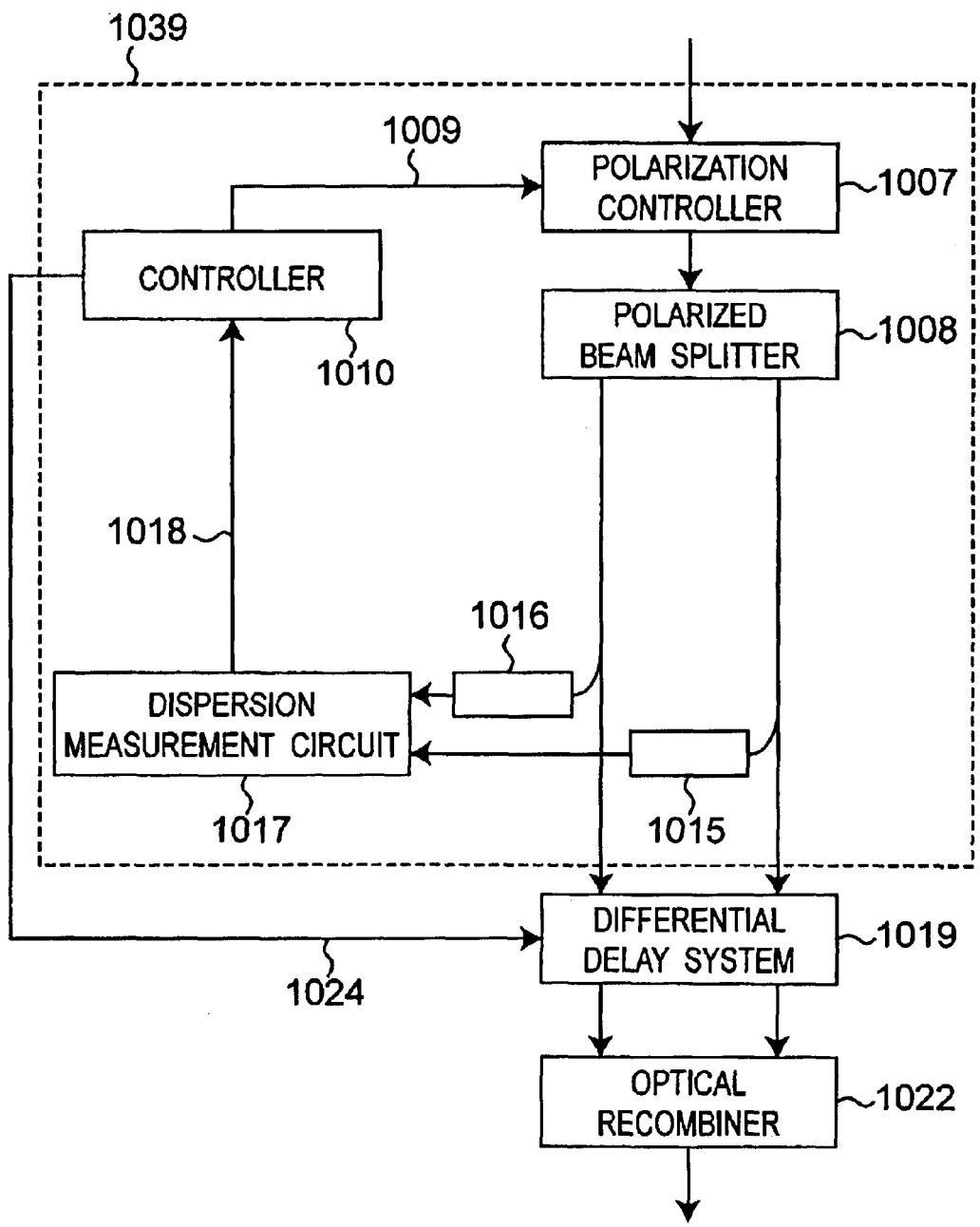
FIG. 30 is a block diagram showing a configuration of a PMD compensating apparatus having a differential delay system 1019 and an optical recombiner 1022 according to a prior art.

As described above, according to the present preferred embodiment, with the constitution of the PMD compensating apparatus 101 made up by using the optical fiber cables 4 and 5 equipped with the center wavelength control units 41 and 51, respectively and each having a chirped grating, and the polarization splitter and combiner 3, it becomes implementable to achieve PMD control for an inputted optical signal by changing the center wavelength of the wavelength band reflected by the chirped grating. Also, since the PMD compensating apparatus does not include such a movable part as that of the PMD compensating apparatus equipped with the movable mirror 203 according to the prior art shown in FIG. 29, the PMD compensating apparatus can be prevented from impairment in reliability due to mechanical deterioration, so that the reliability thereof can be improved over the prior art. Further, since the optical signal is reflected by the chirped grating, the PMD compensating apparatus does not need preparing both the polarization splitter 201 and the polarization combiner 202 as in the prior art shown in FIG. 29, and this structure can be constituted by only one polarization splitter and combiner 3. Thus, the configuration of the PMD compensating apparatus 101 can be simplified, allowing the manufacturing cost to be 15 reduced to a large extent. Further, since the optical signal is reflected by the chirped grating, the PMD compensating apparatus 101 has such a unique advantageous effect as having a wavelength filter function as shown in the reflectance characteristics of FIG. 3A and 3B.

In the above-mentioned preferred embodiment, the PMD compensating apparatus 101 is made up by using the polarization splitter and combiner 3, and therefore, the PMD of the inputted optical signal is controlled by changing the center wavelength of the wavelength band reflected by the chirped grating. However, the present invention is not limited to this, and the center wavelengths of the wavelength bands of two optical signals reflected by the two chirped gratings may be fixedly set so as to be different from each other, respectively.

In the above-mentioned preferred embodiment, each of the optical fiber cables 4 and 5 has a chirped grating. However, the present invention is not limited to this, and each of the optical fiber cables 4 and 5 may be constituted so as to have a uniform pitch grating having a uniform grating period.

In the above-mentioned preferred embodiment, since an optical signal inputted to the PMD compensating apparatus 101 and an optical signal outputted from the PMD compensating apparatus 101 are separated from each other by the optical circulator 2, it becomes possible, for example, to reduce the passage loss because the outputted optical signal does not pass through the polarization controller 1, as compared with a comparative example including the optical circulator 2 at the preceding stage of the polarization controller 1.

Second Preferred Embodiment

Figure 4:
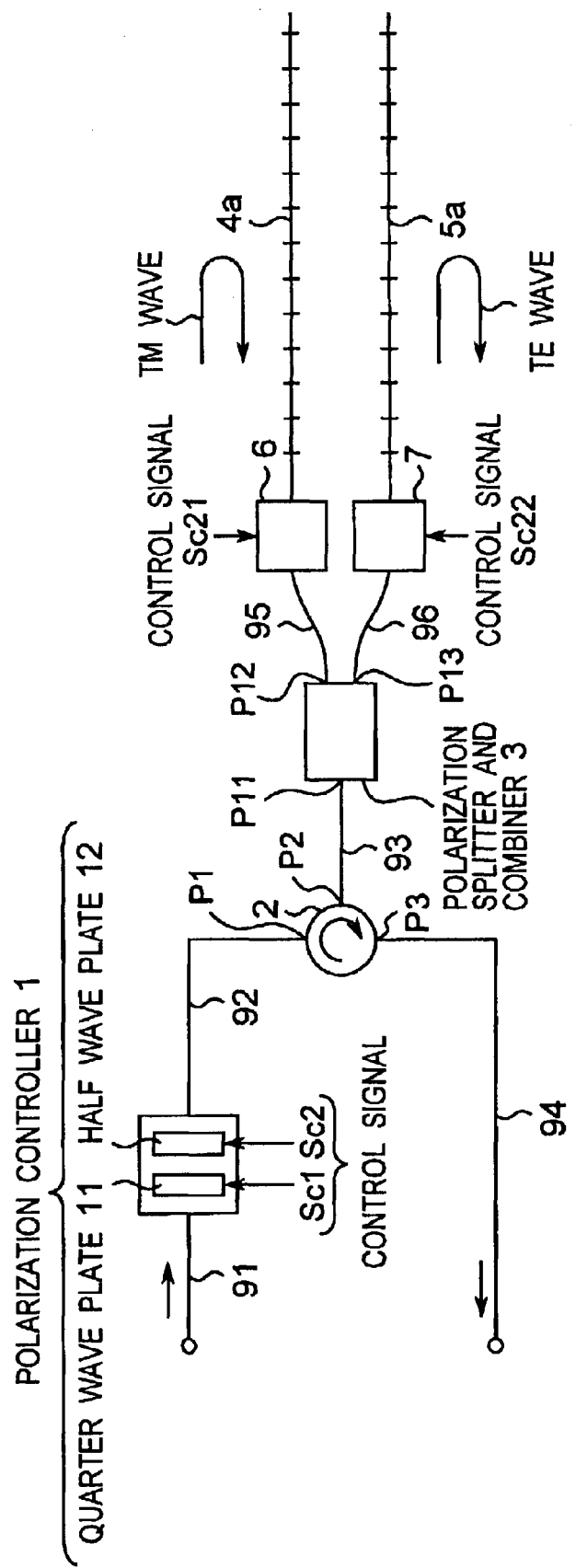
FIG. 4 is a block diagram showing a configuration of a PMD compensating apparatus 102 of a second preferred embodiment according to the present invention.

FIG. 4 is a block diagram showing a configuration of a PMD compensating apparatus 102 of a second preferred embodiment according to the present invention.

Referring to FIG. 4, the PMD compensating apparatus 102 according to the present preferred embodiment includes a polarization controller 1, an optical circulator 2, a polarization splitter and combiner 3, two optical delay controllers 6 and 7, and two optical fiber cables 4a and 5a each having a uniform pitch grating. The PMD compensating apparatus 102 is characterized in that PMD of an optical signal inputted to the PMD compensating apparatus 102 is compensated by controlling the optical delay amount of optical signals passing through the optical delay controllers 6 and 7 by the optical delay controllers 6 and 7.

The PMD compensating apparatus 102 of FIG. 4 is different from the PMD compensating apparatus 101 of FIG. 1 at the following points:

(a) optical fiber cables 4a and 5a each having a uniform pitch grating and equipped without any center wavelength control unit are provided instead of the optical fiber cables 4 and 5 each having the chirped grating and equipped with center wavelength control units 41 and 51, respectively; and (b) an optical delay controller 6 is provided so as to be inserted between the polarization splitter and combiner 3 and the optical fiber cable 4a, while an optical delay controller 7 is provided so as to be inserted between the polarization splitter and combiner 3 and the optical fiber cable 5a.

The PMD compensating apparatus is explained in detail below about these differences.

Referring to FIG. 4, an optical signal of TM wave split and outputted by the polarization splitter and combiner 3 is inputted to the optical delay controller 6 from a second port P12 of the polarization splitter and combiner 3 via an optical fiber cable 95. After an optical delay amount of the optical signal is controlled according to a control signal Sc21 by the optical delay controller 6, the optical signal is inputted to the optical fiber cable 4a having the uniform pitch grating. Then a predetermined wavelength band component of the inputted optical signal is reflected by the uniform pitch grating, and is returned to the second port P12 of the polarization splitter and combiner 3 via the optical fiber cable 95. On the other hand, an optical signal of TE wave split by the polarization splitter and combiner 3 and outputted from the third port P13 thereof is inputted to the optical delay controller 7 via an optical fiber cable 96. After an optical delay amount of the optical signal is controlled according to a control signal Sc22 by the optical delay controller 7, the optical signal is inputted to the optical fiber cable 5a having the uniform pitch grating. Then a predetermined wavelength band component of the inputted optical signal is reflected by the uniform pitch grating, and is returned to the third port P13 of the polarization splitter and combiner 3 via the optical fiber cable 96. The optical signals of the TM and TE waves returned to the polarization splitter and combiner 3 are combined by the polarization splitter and combiner 3. The combined optical signal is inputted to the second port P2 of the optical circulator 2 through an optical fiber cable 93, and thereafter, the optical signal is outputted from the third port P3 thereof, and is further outputted from the PMD compensating apparatus 102 through an optical fiber cable 94.

Figure 6A:
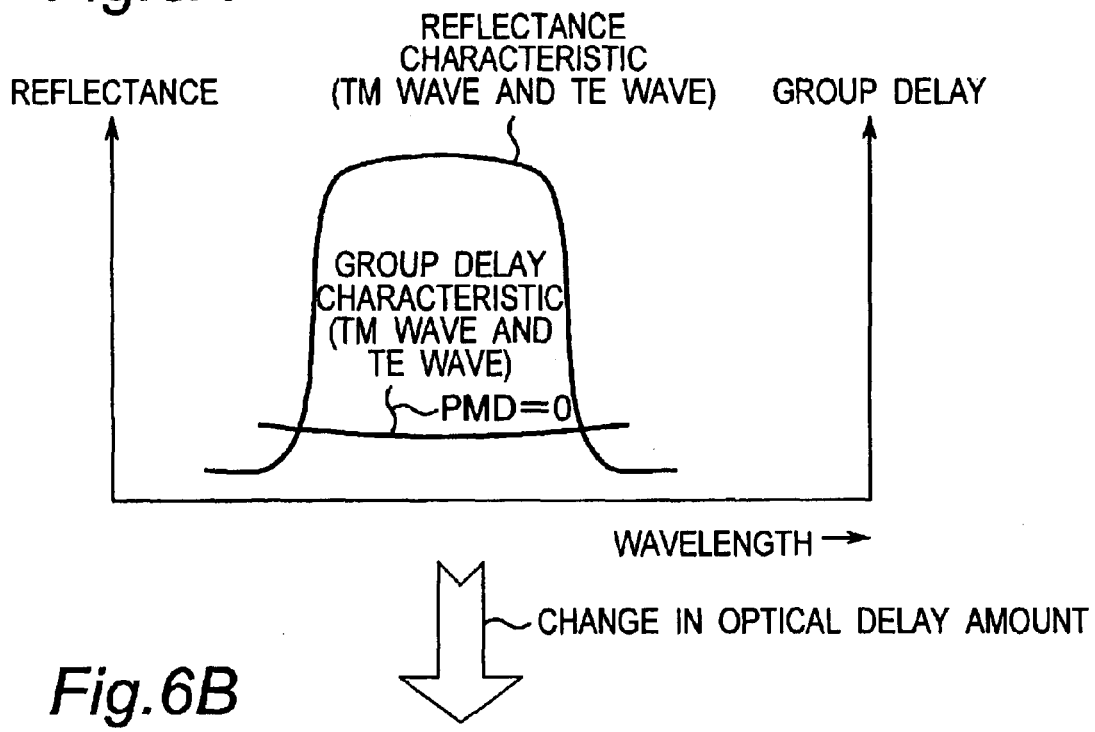
FIG. 6A is a graph showing a reflectance characteristic and a group delay characteristic of the PMD compensating apparatus 102 of FIG. 4, where polarization mode dispersion PMD=0.

The uniform pitch grating of the present preferred embodiment is such that the grating period is uniform with respect to the longitudinal direction of each of the optical fiber cables 4a and 5a as shown in FIG. 4. In each of the optical fiber cables 4a and 5a, the uniform pitch grating is so formed that applying ultraviolet rays via a known uniform pitch mask to an optical fiber cable having no grating causes the refractive index thereof to change with respect to the longitudinal direction thereof at a constant period. The reflection wavelength $\lambda$ of this grating can be expressed by of the above-mentioned Equation (1), in a manner similar to that of above. In this case, the group delay wavelength characteristic of each of the optical fiber cables 4a and 5a each having the uniform pitch grating show generally flat characteristic for both the TM and TE waves as shown in FIG. 6A.

FIG. 5 is a block diagram showing a configuration of the optical delay controllers 6 and 7 of FIG. 4, where the optical delay controllers 6 and 7 have the same constitution as each other as shown in FIG. 5.

Referring to FIG. 5, optical switches 61 and 62 function in interlocking with each other to make one common terminal selectively connected with one contact out of N contacts according to the control signals Sc21 and Sc22. A common terminal of the optical switch 61 is connected with the optical fiber cable 95 or 96, and a common terminal of the optical switch 62 is connected with the optical fiber cable 4a or 5a. Also, a first contact among the N contacts of the optical switch 61 is connected with a first contact among the N contacts of the optical switch 62 via an optical fiber cable 63-1. Further, a second contact of the optical switch 61 is connected with a second contact of the optical switch 62 via an optical fiber cable 63-2. For the following ones, in a manner similar to that of above, an n-th contact of the optical switch 61 is connected with an n-th contact of the optical switch 62 via an optical fiber cable 63-n, where n=3, 4, . . . , N. These optical fiber cables 63-1 to 63-N are formed so that the lengths thereof are different from one another, and the optical delay amount of the optical signal passing from the optical fiber cable 95 or 96 to the optical fiber cable 4a or 5a can be changed by switching over the optical switches 61 and 62 in interlocking with each other.

Figure 6B:
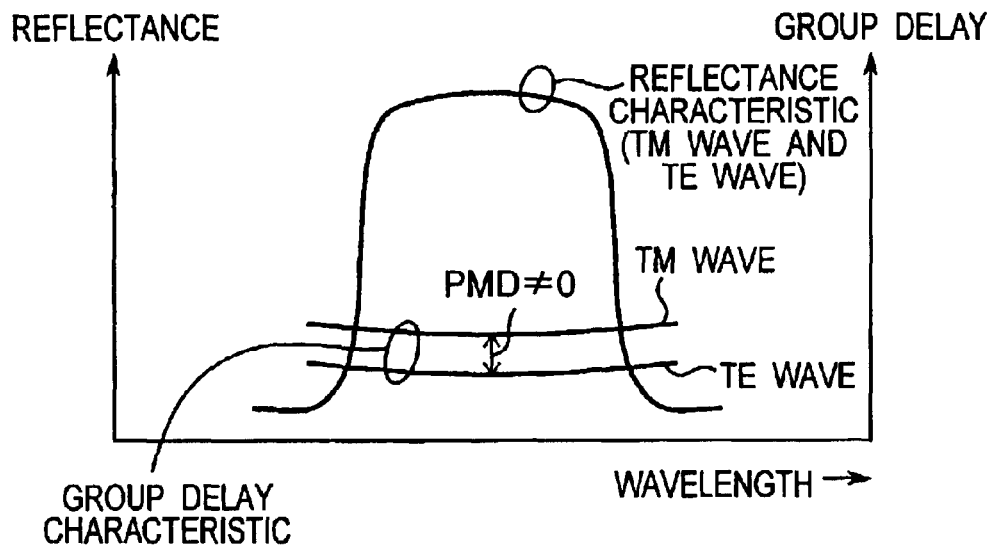
FIG. 6B is a graph showing reflectance characteristic and group delay characteristic of the PMD compensating apparatus 102 of FIG. 4, where polarization mode dispersion PMD≠0, with the optical delay amount changed from the characteristic of FIG. 6A by the optical delay controllers 6 and 7.

In the present preferred embodiment, the optical delay controllers 6 and 7 shown in FIG. 5 are provided so that optical delay amounts of individual optical signals inputted to and reflected by and outputted from the optical fiber cables 4a and 5a each having the uniform pitch grating can be controlled, respectively. In this case, the two optical fiber cables 4a and 5a each having the uniform pitch grating are so formed as to have reflectance characteristics similar to each other, and flat group delay characteristics under the condition that the delay amount of the optical delay controller 6 on the TM wave side and the delay amount of the optical delay controller 7 on the TE wave side are the same as each other. Accordingly, the resulting reflectance characteristics and group delay characteristics are overlapping on each other for the TM and TE waves as shown in FIG. 6A. However, for example, increasing the optical delay amount of the TM-wave side optical delay controller 6 causes occurrence of a difference in group delay characteristic between the TM and TE waves as shown in FIG. 6B, which in turn causes occurrence of a PMD, which is a difference in group delay characteristic between the TM and TE waves. On the other hand, there occurs substantially no difference in the reflectance characteristic between the TM and TE waves. Therefore, the PMD of the optical signal inputted to the PMD compensating apparatus 102 can be controlled by changing the optical delay amounts of the optical delay controllers 6 and 7, so that the PMD can be compensated so as to become substantially zero.

In the above-mentioned preferred embodiment, the optical delay amounts for both TM wave and TE wave can be controlled by providing the optical delay controllers 6 and 7 on both the TM wave and TE wave sides. However, the present invention is not limited to this, and an optical delay controller may be provided on at least one side of the TM wave side and the TE wave side.

As described above, according to the present preferred embodiment, with the constitution of the PMD compensating apparatus 102 made up by using the optical fiber cables 4a and 5a each having the uniform pitch grating, the optical delay controllers 6 and 7 connected with the optical fiber cables 4a and 5a respectively, and the polarization splitter and combiner 3, the PMD of the inputted optical signal can be controlled by changing the optical delay amount of at least one of the optical delay controllers 6 and 7. Also, since the PMD compensating apparatus does not include such a movable part as in the PMD compensating apparatus equipped with the movable mirror 203 according to the prior art shown in FIG. 29, the PMD compensating apparatus can be prevented from impairment in reliability due to mechanical deterioration, so that the reliability thereof can be improved over the prior art. Further, since the optical signal is reflected by the uniform pitch grating, the PMD compensating apparatus does not need preparing both the polarization splitter 201 and the polarization combiner 202 as in the prior art shown in FIG. 29, and these devices 201 and 202 can be constituted by only one polarization splitter and combiner 3. Thus, the configuration of the PMD compensating apparatus 102 can be simplified, allowing the manufacturing cost to be reduced to a large extent. Furthermore, since the optical signal is reflected by the uniform pitch grating, the PMD compensating apparatus 102 has such a unique advantageous effect as having a wavelength filter function as shown in the reflectance characteristic of FIG. 6A or 6B.

In the above-mentioned preferred embodiment, since the optical fiber cables 4a and 5a each having the uniform pitch grating is used, the optical fiber cables 4a and 5a becomes easier to manufacture than those when the optical fiber cables 4 and 5 each having the chirped grating are used as in the first preferred embodiment.

In the above-mentioned preferred embodiment, the optical fiber cables 4a and 5a each have the uniform pitch grating. However, the present invention is not limited to this, and each of the optical fiber cables 4a and 5a may be constituted so as to have a chirped grating.

Figure 7:
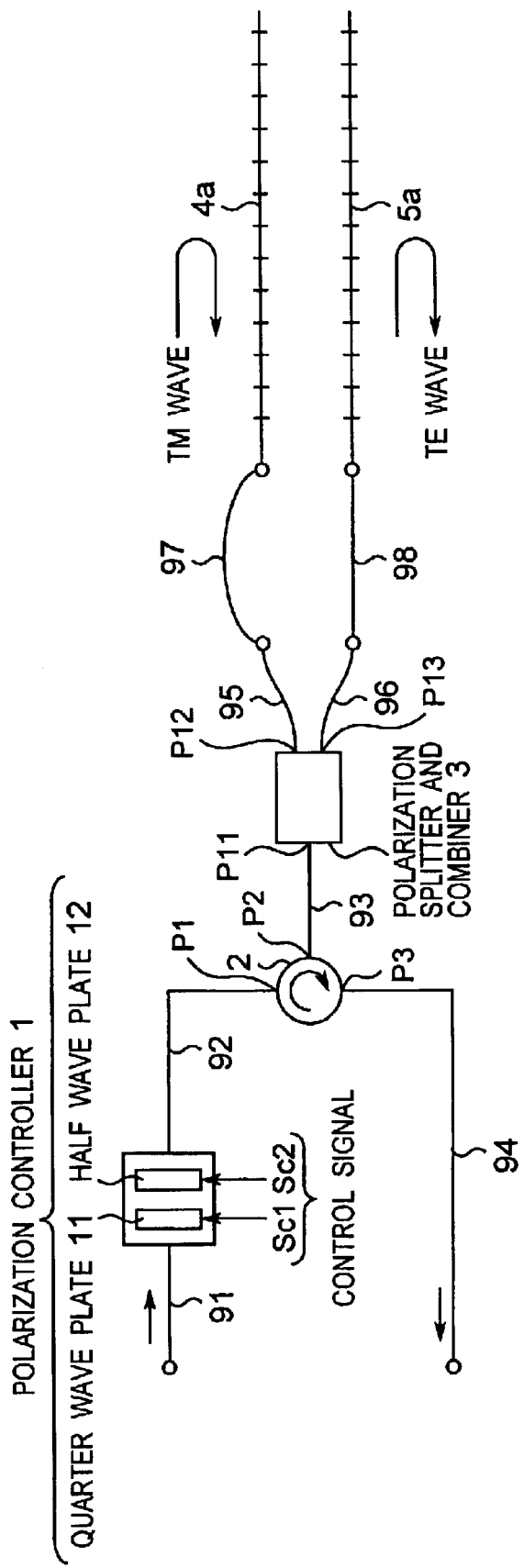
FIG. 7 is a block diagram showing a configuration of a PMD compensating apparatus 102a of an implemental example of the second preferred embodiment according to the present invention.

FIG. 7 is a block diagram showing a configuration of a PMD compensating apparatus 102a which is a modified preferred embodiment of the second preferred embodiment according to the present invention. The PMD compensating apparatus 102a of the present modified preferred embodiment is different from the PMD compensating apparatus 102 of FIG. 4 at the following points:

(a) an optical fiber cable 97 having a fixed length is provided instead of the optical delay controller 6; and (b) an optical fiber cable 98 having a length different from that of the optical fiber cable 97 is provided instead of the optical delay controller 7.

In the PMD compensating apparatus 102a constituted as described above, the optical delay amount can be set fixedly for both the TM and TE waves, and therefore, the PMD compensating apparatus 102a having a fixed PMD can be obtained. This means that the PMD compensating apparatus 102a may be manufactured by setting predetermined optical delay amounts predetermined in the design stage.

Further, it is also possible that the optical fiber cable 97 having a fixed length is used as it is connected with the optical delay controller 6 in combination, while the optical fiber cable 98 having the length different from that of the optical fiber cable 97 is used as it is connected with the optical delay controller 7 in combination. In this case, preferably, it may also be arranged that, for example, almost all the PMD of the optical transmission line is compensated by the optical fiber cables 97 and 98 while the remaining small amount of PMD is compensated by the optical delay controllers 6 and 7.

Third Preferred Embodiment

FIG. 8 is a block diagram showing a configuration of a PMD compensating apparatus 103 of a third preferred embodiment according to the present invention.

Referring to FIG. 8, the PMD compensating apparatus 103 according to the present preferred embodiment includes a polarization controller 1, an optical circulator 2, a polarization splitter and combiner 3, two optical fiber cables 4 and 5 each having a chirped grating, and center-wavelength and chirping-rate control units 71 and 81 provided on the optical fiber cables 4 and 5, respectively. The PMD compensating apparatus 103 is characterized in that PMD of an optical signal inputted to the PMD compensating apparatus 103 is compensated by controlling the center wavelength of the wavelength band of the optical signal reflected by the chirped gratings by means of the center-wavelength and chirping-rate control units 71 and 81, and moreover that wavelength dispersion of an optical signal inputted to the PMD compensating apparatus 103 is controlled by controlling the gradients of group delay characteristic of optical signals reflected by the chirped grating by means of the center-wavelength and chirping-rate control units 71 and 81.

The PMD compensating apparatus 103 according to the present preferred embodiment shown in FIG. 8 is different from the PMD compensating apparatus 101 according to the first preferred embodiment shown in FIG. 1 at the following points:

(a) a center-wavelength and chirping-rate control unit 71 is provided instead of the center wavelength control unit 41 provided on the optical fiber cable 4; and (b) a center-wavelength and chirping-rate control unit 81 is provided instead of the center wavelength control unit 51 provided on the optical fiber cable 5.

An implemental example of these center-wavelength and chirping-rate control units 71 and 81, which are the differences, will be explained in detail below.

Figure 9A:
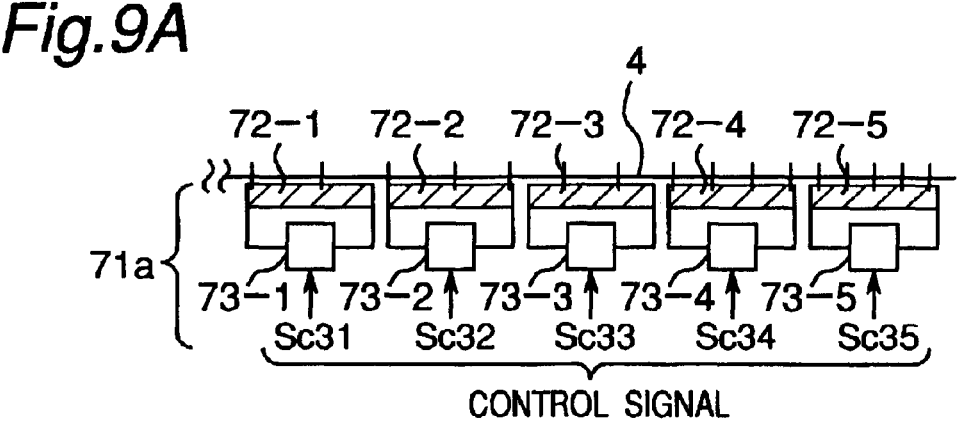
FIG. 9A is a schematic block diagram showing a configuration of a first implemental example 71a of a center-wavelength and chirping-rate control unit 71 provided on the optical fiber cable 4 having a chirped grating of FIG. 8.

FIG. 9A is a schematic block diagram showing a configuration of a first implemental example 71a of the center-wavelength and chirping-rate control unit 71 provided on the optical fiber cable 4 having the chirped grating of FIG. 8.

Referring to FIG. 9A, a plurality of, for example, five temperature-control heaters 72-1 to 72-5 are provided along the longitudinal direction of the optical fiber cable 4 so as to be thermally coupled with the optical fiber cable 4, and control voltage generators 73-1 to 73-5 for supplying predetermined operating voltages to those temperature-control heaters 72-1 to 72-5 are connected with the temperature-control heaters 72-1 to 72-5, respectively. The control voltage generators 73-1 to 73-5 control the operating voltages to be applied to the temperature-control heaters 72-1 to 72-5, respectively, according to inputted control signals Sc31 to Sc35, and this allows to control the temperature distribution in the longitudinal direction of the optical fiber cable 4 having the chirped grating. That is, the chirping rate, which is the refractive index distribution or the gradient thereof in the longitudinal direction of the optical fiber cable 4 is changed by changing the temperature distribution in the longitudinal direction of the optical fiber cable 4 by the thermooptic effect which has been known to those skilled in the art, thus making it possible to change the reflectance characteristic or group delay characteristic of the wavelength band of optical signals reflected by the two chirped gratings as apparent from the Equation (1). In this case, by changing the average value of temperature in the longitudinal direction of the optical fiber cable 4, the average value of refractive index in the longitudinal direction of the optical fiber cable 4 is changed, and this leads to that the center wavelength of the wavelength band of optical signals reflected by the two chirped gratings can be changed. Further, by changing the gradient of temperature distribution in the longitudinal direction of the optical fiber cable 4, the chirping rate, which is the gradient of refractive index distribution in the longitudinal direction of the optical fiber cable 4, is changed, and this leads to that the wavelength dispersion of group delay characteristic in the wavelength band of optical signals reflected by the two chirped gratings can be changed.

Figure 9B:
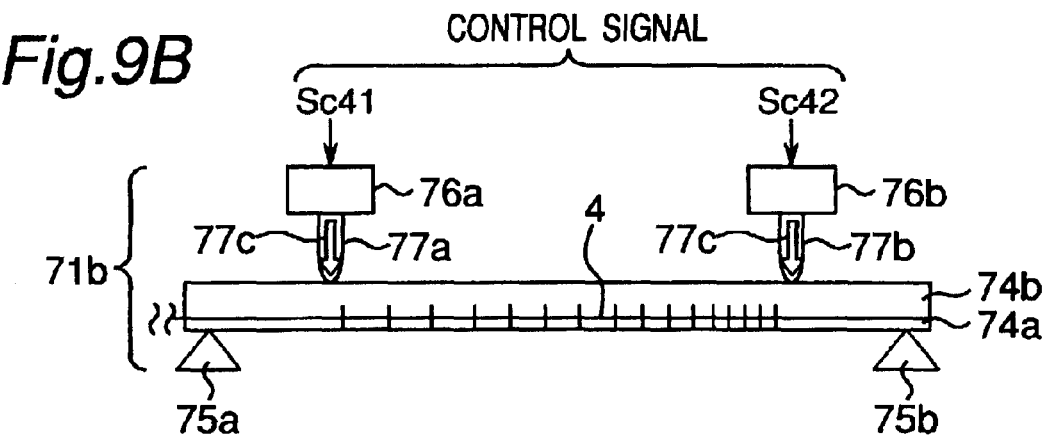
FIG. 9B is a schematic block diagram showing a configuration of a second implemental example 71b of the center-wavelength and chirping-rate control unit 71 provided on the optical fiber cable 4 having the chirped grating of FIG. 8.

FIG. 9B is a schematic block diagram showing a configuration of a second implemental example 71b of the center-wavelength and chirping-rate control unit 71 provided on the optical fiber cable 4 having the chirped grating of FIG. 8.

Referring to FIG. 9B, the optical fiber cable 4 is sandwiched by a pair of sandwiching flat plates 74a and 74b, and left-and-right end portions in the longitudinal direction of these sandwiching flat plates 74a and 74b are retained by retainer bases 75a and 75b so that the sandwiching flat plates 74a and 74b are retained horizontally. Also, two stress-control actuators 76a and 76b have stress-applying bars 77a and 77b, respectively, and tip ends of the stress-applying bars 77a and 77b make contact with the top surface of the sandwiching flat plate 74a to apply stress vertically (in a direction shown by arrows 77c) to both-side outer positions than the portions where the chirped gratings are formed in the optical fiber cable 4, and this leads to that the stress is applied to the optical fiber cable 4 in a direction vertical to the longitudinal direction of the optical fiber cable 4. In this case, the stress-control actuators 76a and 76b control the stress distribution according to control signals Sc41 and Sc42, so as to physically change the grating shape or the like of the optical fiber cable 4 having chirped gratings, and this leads to change in the distribution of grating period of the optical fiber cable 4. That is, by changing the stress distribution in the longitudinal direction of the optical fiber cable 4, the chirping rate, which is the grating period distribution or the gradient thereof in the longitudinal direction of the optical fiber cable 4, is changed, and this to that the reflectance characteristic or group delay characteristic of the wavelength band of optical signals reflected by the two chirped gratings can be changed. In this case, by changing the average value of stress distribution in the longitudinal direction of the optical fiber cable 4, the average value of grating period in the longitudinal direction of the optical fiber cable 4 is changed, and this leads to that the center wavelength of the wavelength band of optical signals reflected by the two chirped gratings can be changed. Further, by changing the gradient of stress distribution in the longitudinal direction of the optical fiber cable 4, the chirping rate, which is the gradient of grating period distribution in the longitudinal direction of the optical fiber cable 4, is changed, and this leads to that the wavelength dispersion of group delay characteristic in the wavelength band of optical signals reflected by the two chirped gratings can be changed.

Figure 9C:
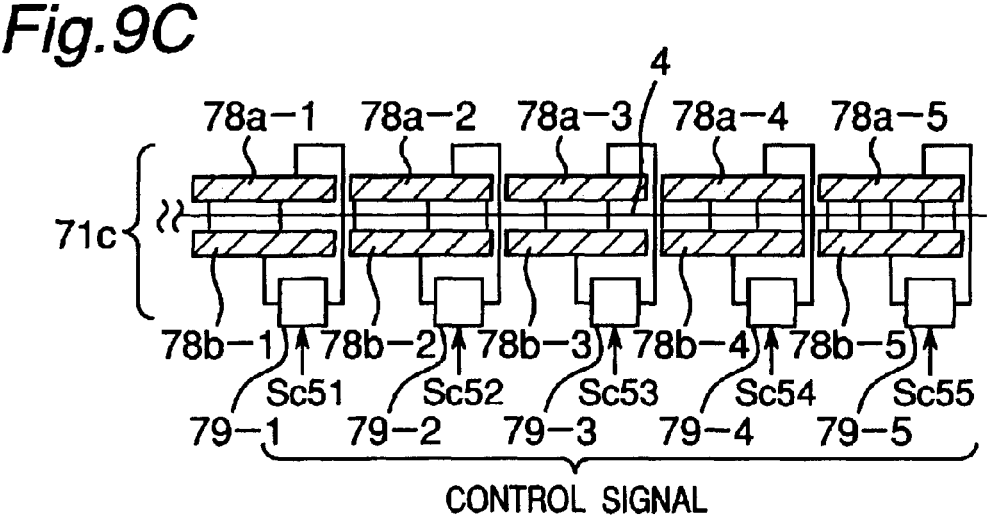
FIG. 9C is a schematic block diagram showing a configuration of a third implemental example 71c of the center-wavelength and chirping-rate control unit 71 provided on the optical fiber cable 4 having the chirped grating of FIG. 8.

FIG. 9C is a schematic block diagram showing a configuration of a third implemental example 71c of the center-wavelength and chirping-rate control unit 71 provided on the optical fiber cable 4 having the chirped grating of FIG. 8.

Referring to FIG. 9C, a plurality of, for example, five pairs of electric-field control electrodes 78a-1 and 78b-1; 78a-2 and 78b-2; 78a-3 and 78b-3; 78a-4 and 78b-4; 78a-5 and 78b-5 are provided on both sides of the optical fiber cable 4 along the longitudinal direction thereof so that a predetermined electric field can be applied to the optical fiber cable 4, and control voltage generators 79-1 to 79-5 for supplying predetermined operating voltages to those pairs of electric-field control electrodes 78a-1 and 78b-1; 78a-2 and 78b-2; 78a-3 and 78b-3; 78a-4 and 78b-4; 78a-5 and 78b-5 are connected with the pairs of electric-field control electrodes 78a-1 and 78b-1; 78a-2 and 78b-2; 78a-3 and 78b-3; 78a-4 and 78b-4; 78a-5 and 78b-5, respectively. The control voltage generators 79-1 to 79-5 control the operating voltages to be applied to the pairs of electric-field control electrodes 78a-1 and 78b-1; 78a-2 and 78b-2; 78a-3 and 78b-3; 78a-4 and 78b-4; 78a-5 and 78b-5, respectively, according to inputted control signals Sc51 to Sc55, and this leads to control of the electric field distribution in the longitudinal direction applied to the optical fiber cable 4 having the chirped grating. That is, the chirping rate, which is the refractive index distribution or the gradient thereof in the longitudinal direction of the optical fiber cable 4 is changed by changing the electric field distribution in the longitudinal direction of the optical fiber cable 4 by the electrooptic effect which has been known to those skilled in the art, thus making it possible to change the reflectance characteristic or group delay characteristic of the wavelength band of optical signals reflected by the two chirped gratings as apparent from the Equation (1). In this case, by changing the average value of electric field in the longitudinal direction of the optical fiber cable 4, the average value of refractive index in the longitudinal direction of the optical fiber cable 4 is changed, and this leads to that the center wavelength of the wavelength band of optical signals reflected by the two chirped gratings can be changed. Also, by changing the gradient of electric field distribution in the longitudinal direction of the optical fiber cable 4, the chirping rate, which is the gradient of refractive index distribution in the longitudinal direction of the optical fiber cable 4, is changed, and this leads to that the wavelength dispersion of group delay characteristic in the wavelength band of optical signals reflected by the two chirped gratings can be changed.

In addition, the optical fiber cable 5 is also equipped with center-wavelength and chirping-rate control units 81 having a constitution similar to that of the center-wavelength and chirping-rate control units 71a, 71b and 71c, in a manner similar to that of the optical fiber cable 4.

The chirped gratings of the two optical fiber cables 4 and 5 are so formed as to have reflectance characteristics or group delay characteristics which are similar to each other before the operation of the center-wavelength and chirping-rate control units 71 and 81, and therefore, wavelength characteristics of the TM and TE waves overlap on each other as shown in FIG. 3A. However, when the center wavelength of the wavelength band of the chirped grating of one optical fiber cable 4 or 5 chirped grating is shifted by controlling the average value of temperature, the stress or the electric field by the center-wavelength and chirping rate control units 71 and 81, there arises a difference in group delay characteristic as shown in FIG. 3B, causing occurrence of a PMD, which is a difference in group delay characteristic between the TM and TE waves. Therefore, the PMD substantially proportional to the applied temperature, stress or electric field can be generated, and then, the PMD can be controlled. Also, the PMD can be compensated so as to become substantially zero.

Figure 11A:
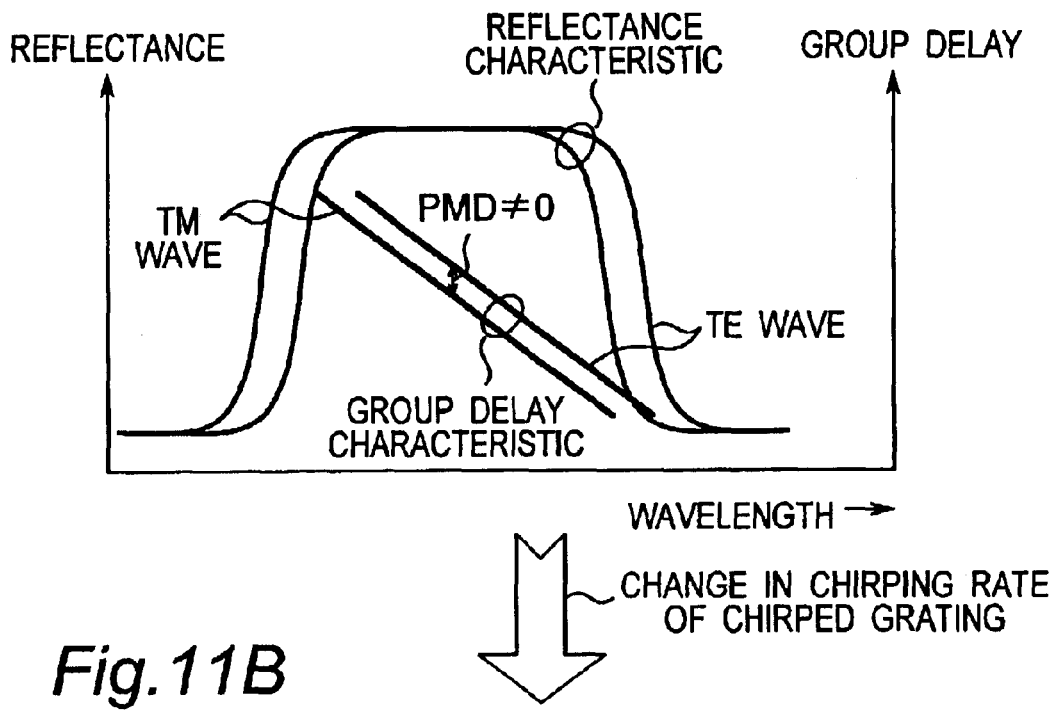
FIG. 11A is a graph showing a reflectance characteristic and a group delay characteristic of the PMD compensating apparatus 103 of FIG. 8 with a polarization mode dispersion PMD≠0.
Figure 11B:
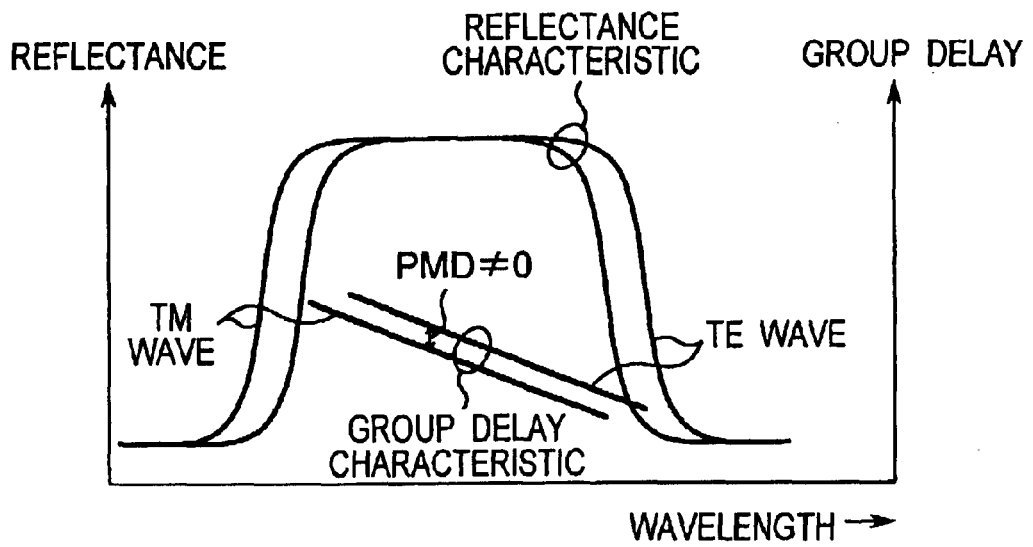
FIG. 11B is a graph showing a reflectance characteristic and a group delay characteristic of the PMD compensating apparatus 103 of FIG. 8, when a chirping rate of the chirped grating is changed from the characteristic of FIG. 11A by the center-wavelength and chirping-rate control unit 71.

Further, when the distribution of temperature, stress or electric field of both chirped gratings is controlled by the center-wavelength and chirping-rate control units 71 and 81 as indicated by reference numerals 82, 83 and 84 of FIG. 10 so that their gradient is changed, the chirping rate of the chirped gratings is changed, and this makes it possible to control the gradient of group delay characteristic so that the group delay characteristic showing the case where PMD≠0 is changed from the group delay characteristics of FIG. 11A to the group delay characteristic of FIG. 11B. As a result of this, the wavelength dispersion characteristic of group delay can be controlled so that the group delay characteristic becomes flatter.

The above description has been made on the case where the chirped gratings of the two optical fiber cables 4 and 5 are so formed as to have reflectance characteristics or group delay characteristics which are similar to each other before the operation of the center-wavelength and chirping-rate control units 71 and 81. However, the chirped gratings may be formed so that the chirped gratings of the two optical fiber cables 4 and 5 have center wavelengths which are originally different from each other and chirping rates which are originally different from each other. In this case, it is necessary to control the gradient of temperature, stress or electric field so that the chirping rates of the two chirped gratings become substantially equal to each other. Also, in the case where the two chirped gratings have center wavelengths which are different from each other, the PMD value is not zero but a certain significant value. In order to obtain the PMD value of zero in such a case, it is appropriate to control the average value of temperature, stress or electric field so that the center wavelengths of the two chirped gratings become substantially equal to each other. In other words, in the present preferred embodiment, preferably, the center wavelengths of the two chirped gratings are controlled independently of each other by the center-wavelength and chirping-rate control units 71 and 81 while the chirping rates of the two chirped gratings are controlled in manners similar to each other, respectively.

As described above, according to the present preferred embodiment, since the PMD can be controlled by controlling the center wavelengths of the two chirped gratings by the center-wavelength and chirping-rate control units 71 and 81, it becomes possible to achieve such a compensation that the PMD of optical transmission lines such as optical fiber cables becomes zero. Further, since the wavelength dispersion can be controlled by controlling the chirping rates of the two chirped gratings, it becomes possible to compensate the wavelength dispersion of the optical transmission line in such a manner that, for example, the wavelength dispersion of group delay can be controlled so as to be substantially eliminated. In the present preferred embodiment, the group delay characteristic is controlled in the way of linear function, the control in the way of quadratic function or cubic function enables compensation of higher wavelength dispersion.

The PMD compensating apparatus 103 according to the third preferred embodiment having the constitution as described above has operation and advantageous effects similar to those of the PMD compensating apparatuses 101 and 102 according to the first and second preferred embodiments. Further, in addition to this, such a unique advantageous effect that the wavelength dispersion of the optical transmission line can be compensated so that, for example, the wavelength dispersion of group delay can be controlled so as to be substantially eliminated.

In the above-mentioned preferred embodiment, the optical fiber cables 4 and 5 each have a chirped grating. However, the present invention is not limited to this, each of the optical fiber cables 4 and 5 may be constituted so as to have a uniform pitch grating.

Fourth Preferred Embodiment

FIG. 12 is a block diagram showing a configuration of a PMD compensating apparatus 104 of a fourth preferred embodiment according to the present invention.

Referring to FIG. 12, the PMD compensating apparatus 104 according to the present preferred embodiment includes a polarization controller 1, an optical circulator 2, a polarization splitter and combiner 3, two optical fiber cables 4 and 5 each having a chirped grating, and center-wavelength and chirping-rate control units 171 and 181 provided on the optical fiber cables 4 and 5, respectively. In this case, the center-wavelength and chirping-rate control units 171 and 181 have constitutions similar to the center-wavelength and chirping-rate control units 71 and 81 of the third preferred embodiment shown in FIG. 8, however, is different in the control method of center wavelength and chirping rate from the center-wavelength and chirping-rate control units 71 and 81 as detailed below.

The chirped gratings of the two optical fiber cables 4 and 5 are so formed as to have reflectance characteristics and group delay characteristics which are similar to each other before the operation of the center-wavelength and chirping-rate control units 171 and 181, and wavelength characteristics of the TM and TE waves overlap on each other as shown in FIG. 3A. However, when the center wavelength of the chirped grating of one optical fiber cable 4 or 5 chirped grating is shifted by controlling the average value of temperature, stress or electric field by the center-wavelength and chirping-rate control units 171 and 181, there arises a difference in group delay characteristic between the TM and TE waves as shown in FIG. 3B, causing occurrence of a PMD, which is a difference in group delay characteristic between the TM and TE waves. Accordingly, in this fourth preferred embodiment, in a manner similar to that of the second and third preferred embodiments, the PMD substantially proportional to the applied temperature, stress or electric field can be generated, and this leads to control of the PMD. In particular, the PMD can be compensated so as to become substantially zero.

Figure 13:
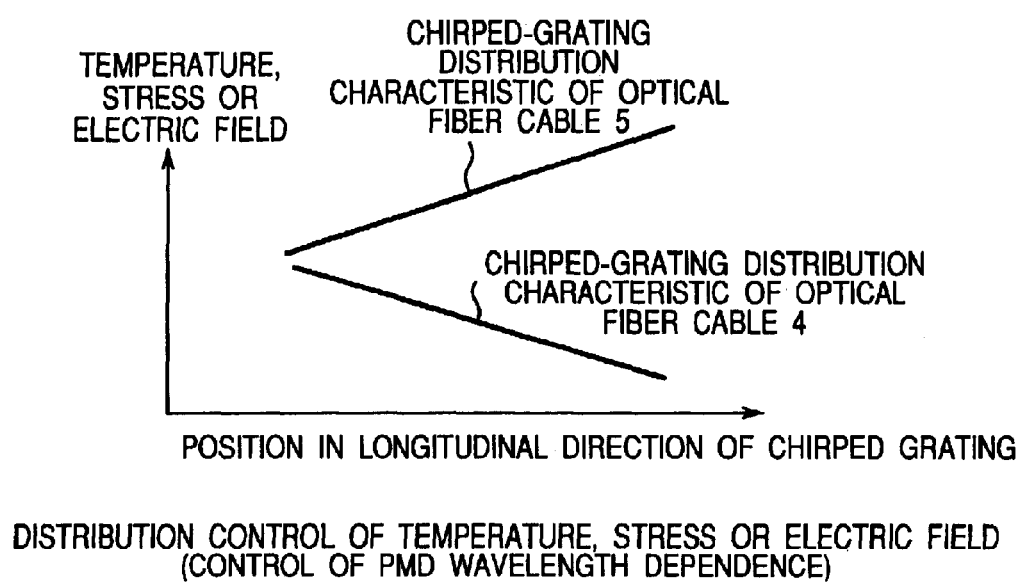
FIG. 13 is a graph showing distribution control of temperature, stress or electric field with respect to the position in the longitudinal direction of the chirped grating when grating distributions different from each other are formed in the chirped gratings of the optical fiber cables 4 and 5 of FIG. 8, respectively.
Figure 14A:
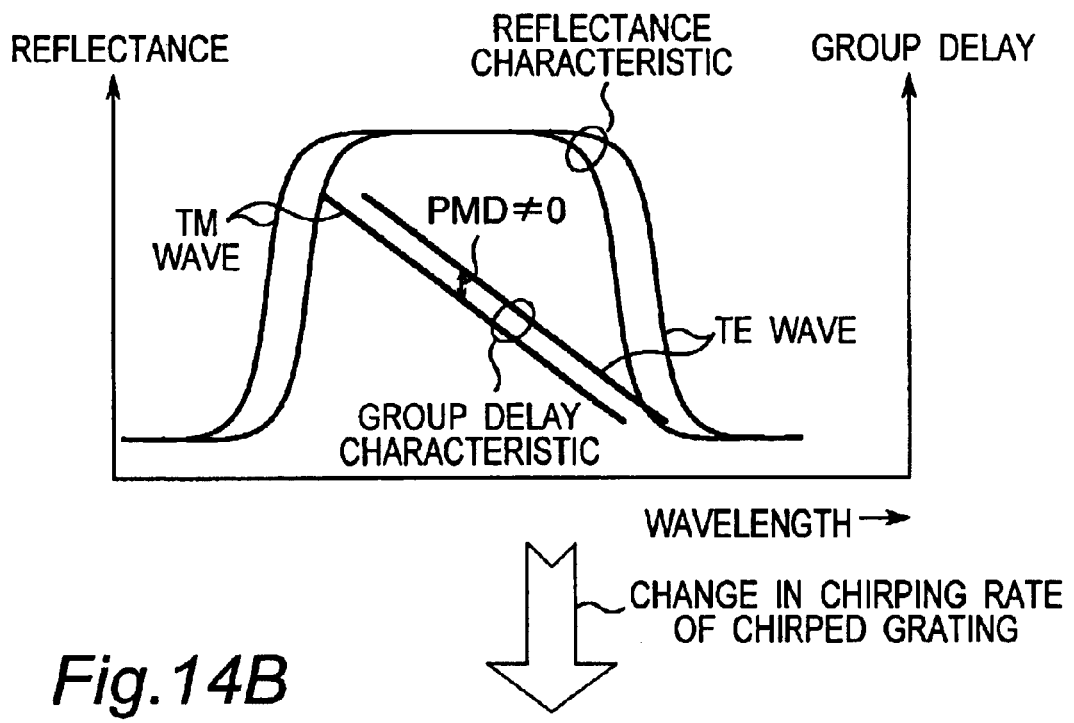
FIG. 14A is a graph showing a reflectance characteristic and a group delay characteristic of the PMD compensating apparatus 104 of FIG. 12 with a polarization mode dispersion PMD≠0.
Figure 14B:
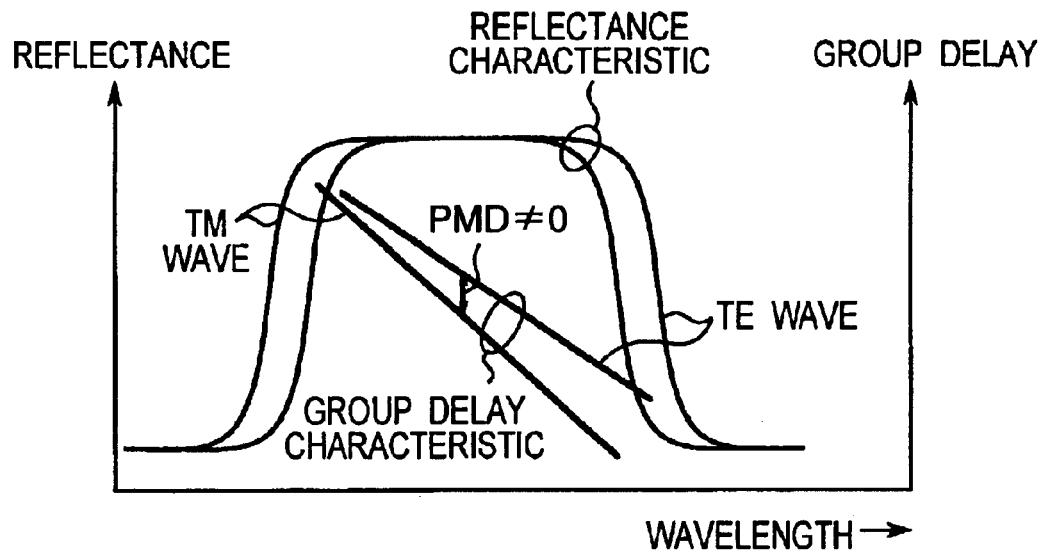
FIG. 14B is a graph showing a reflectance characteristic and a group delay characteristic of the PMD compensating apparatus 104 of FIG. 12, when the chirping rate of the chirped grating is changed from the characteristic of FIG. 14A by a center-wavelength and chirping-rate control unit 171.

Further, when the gradients of temperature, stress or electric field of the chirped gratings of the optical fiber cables 4 and 5 are controlled by the center-wavelength and chirping-rate control units 171 and 181, for example, as shown in FIG. 13, i.e., in such a manner that the distribution characteristics of the chirped gratings of the optical fiber cables 4 and 5 have mutually different gradients (e.g., in the example of FIG. 13, in such a manner that the gradients of distribution characteristics of the chirped gratings of the optical fiber cables 4 and 5 become different in sign from each other, although their absolute values are substantially equal to each other), the chirped gratings of the optical fiber cables 4 and 5 show different change distributions of chirping rate. Therefore, in the case where the gratings of the distribution characteristics of the chirped gratings of the optical fiber cables 4 and 5 are substantially the same as each other, and for example, when the chirped gratings of the optical fiber cables 4 and 5 have group delay characteristics shown in FIG. 14A, setting of the gradients of temperature, stress or electric field of the chirped gratings of the optical fiber cables 4 and 5 as shown in FIG. 13 makes it possible to control the wavelength characteristic of the difference in group delay between the TM and TE waves, i.e. to control the wavelength dependence of PMD, as shown in FIG. 14B.

In the present preferred embodiment, preferably, the center wavelengths of the two chirped gratings are controlled independently of each other by the center-wavelength and chirping-rate control units 171 and 181 while the chirping rates of the two chirped gratings are controlled independently of each other.

Figure 15:
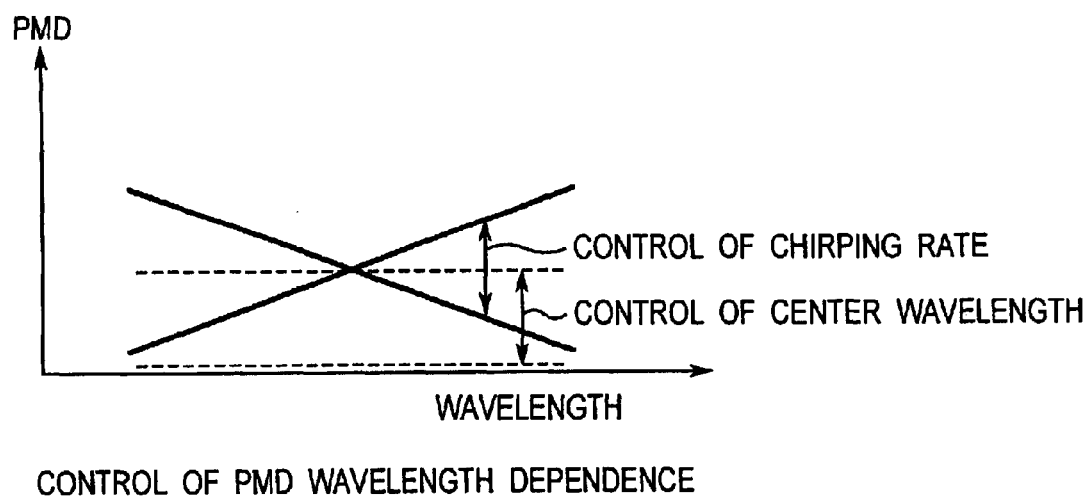
FIG. 15 is a graph showing that wavelength dependence of polarization mode dispersion (PMD) is controlled by the PMD compensating apparatus 104 of FIG. 12.

Accordingly, in the present preferred embodiment, as shown in FIG. 15, the wavelength dependence of PMD can be controlled by controlling the chirping rates of the individual chirped gratings, while the average value of PMD can be controlled by controlling their center wavelengths.

In the present preferred embodiment, it has been assumed that the two chirped gratings are so formed as to have reflectance characteristics and group delay characteristics which are similar to each other before the operation of the center-wavelength and chirping-rate control units 171 and 181. However, there may be used chirped gratings of the optical fiber cables 4 and 5 having center wavelengths which are originally different, from each other and chirping rates which are originally different from each other. In the case of different center wavelengths, the changing value of PMD is not zero but a predetermined value. In order to obtain the PMD value of zero, it is appropriate to control the average value of temperature, stress or electric field so that the center wavelengths become substantially equal to each other. A wavelength dependence of PMD is involved in the case of different chirping rates, the wavelength dependence can be substantially eliminated by controlling the distribution of temperature, stress or electric field so that the chirping rates of the individual optical fiber cables 4 and 5 become substantially equal to each other.

As described above, according to the present preferred embodiment, since the PMD can be controlled by controlling the center wavelengths of the chirped gratings of the individual optical fiber cables 4 and 5, it becomes possible to achieve such a compensation that the PMD of optical transmission lines such as optical fiber cables becomes, for example, substantially zero. Further, since the wavelength dependence of PMD in the optical transmission line can be controlled by controlling the chirping rates of the chirped gratings of the two optical fiber cables 4 and 5, the compensation can be achieved in such a manner that the wavelength dispersion of PMD of the optical transmission line is substantially eliminated.

Therefore, the PMD compensating apparatus 104 according to the present preferred embodiment has operation and advantageous effects similar to those of the PMD compensating apparatuses 101, 102 and 103 according to the first, second and third preferred embodiments. Further, in addition to this, such a unique advantageous effect that the wavelength dependence of PMD of the optical transmission line can be controlled, allowing the PMD to be compensated so that the wavelength dependence of PMD of the optical transmission line is substantially eliminated.

In the above-mentioned preferred embodiment, the optical fiber cables 4 and 5 each have the chirped grating. However, the present invention is not limited to this, each of the optical fiber cables 4 and 5 may be constituted so as to have a uniform pitch grating.

Fifth Preferred Embodiment

Figure 16:
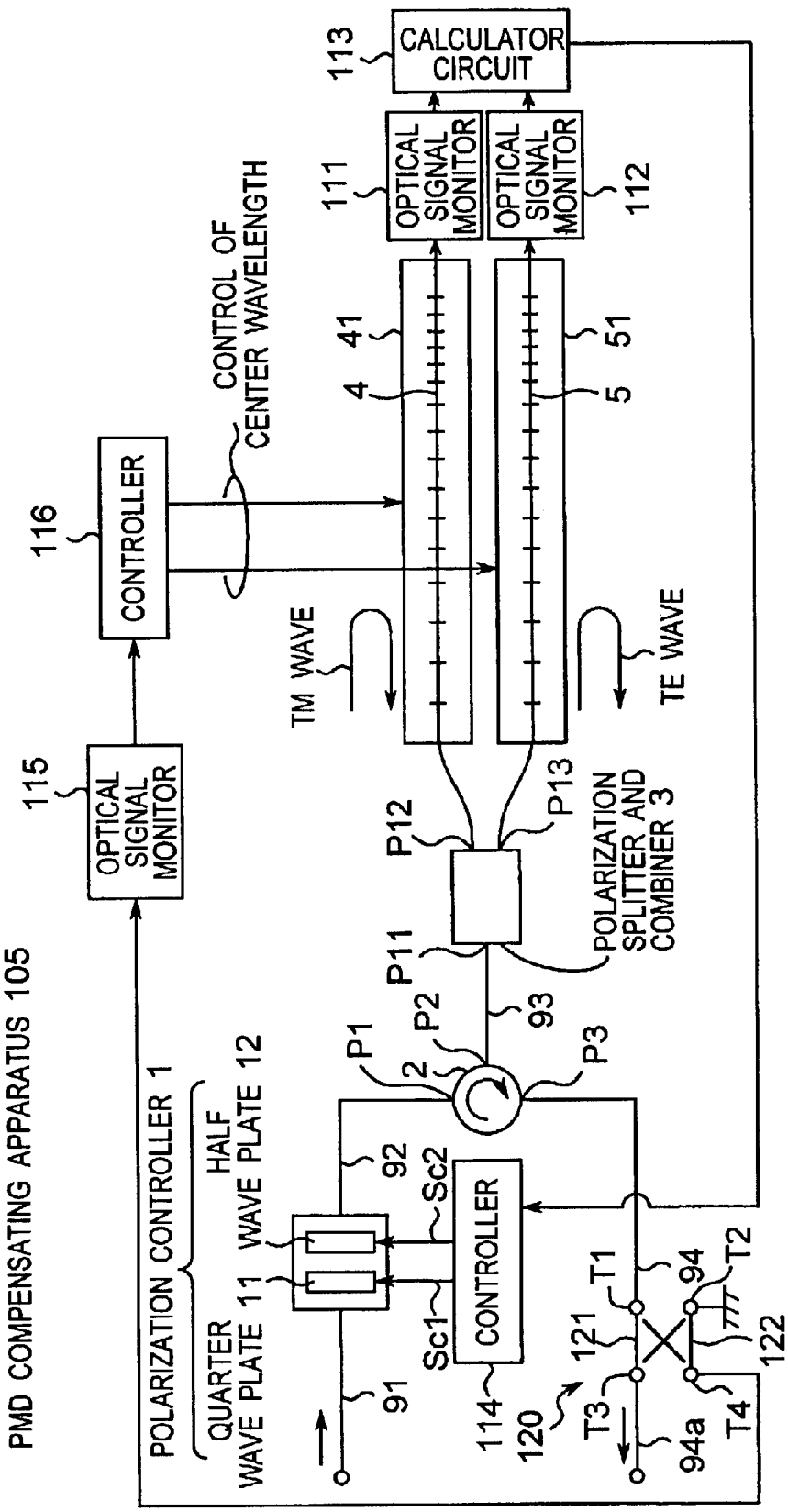
FIG. 16 is a block diagram showing a configuration of a PMD compensating apparatus 105 of a fifth preferred embodiment according to the present invention.

FIG. 16 is a block diagram showing a configuration of a PMD compensating apparatus 105 of a fifth preferred embodiment of the present invention. As shown in FIG. 16, the PMD compensating apparatus 105 of the fifth preferred embodiment is different from the PMD compensating apparatus 101 of the first preferred embodiment shown in FIG. 1 at the following points:

(a) There are further provided optical signal monitors 111 and 112, a calculator circuit 113, and a controller 114.

(b) There are further provided an optical directional coupler 120, an optical signal monitor 115, and a controller 116.

(c) An optical signal inputted to the polarization controller 1 is intensity-modulated by the transmission side by using a predetermined clock signal according to a predetermined digital data signal.

Figure 17:
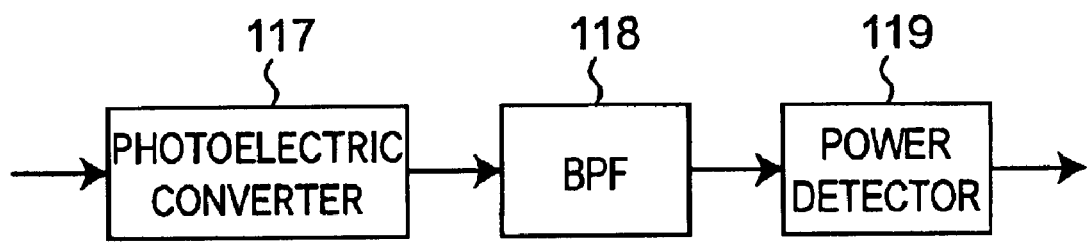
FIG. 17 is a block diagram showing a configuration of optical signal monitors 111, 112, 115, 141 and 142 of FIG. 16.

Hereinbelow, detailed description will be given of these different points. Referring to FIG. 16, the optical signal monitors 111 and 112 are respectively provided on the terminal-end side of the optical fiber cables 4 and 5 each having a chirped grating. Each of the optical signal monitors 111 and 112 detects the level of baseband spectrum of a predetermined frequency of the inputted optical signal, and outputs a detection signal thereof to the calculator circuit 113. In this case, as shown in FIG. 17, each of the optical signal monitors 111 and 112 is constituted by including a photoelectric converter 117, a band-pass filter 118, and a power detector 119. In each of the optical signal monitors 111 and 112, the photoelectric converter 117, which is constituted by including a photodiode, photoelectrically converts an inputted optical signal into an electric signal, and then, outputs the electric signal to the power detector 119 via the band pass filter 118 which band-pass-filters only a spectrum component of a predetermined narrow-band frequency width among spectrum components of the intensity-modulated baseband signal. Then, the power detector 119 detects a signal power of the band-pass-filtered spectrum component, and outputs a detection signal representing the signal power to the calculator circuit 113 of FIG. 16. It is noted that the constitution of the optical signal monitors 111 and 112 shown in FIG. 17 is identical to that of later-described signal monitors 115, 141 and 142.

The calculator circuit 113 calculates the sum of two inputted detection signals, and outputs a control signal exhibiting the calculated sum of the detection signals to the controller 114. Based on the inputted control signal, the controller 114 generates control signals Sc1 and Sc2 to the polarization controller 1 so as to substantially maximize the sum of the detection signals for controlling the polarization controller 1. This makes it possible to control waveform distortion of the optical signal from each of the optical fiber cables 4 and 5 to be substantially the minimum so as to optimally control the polarization controller 1 as described later. Although in the above-mentioned preferred embodiment, the polarization controller 1 is controlled so as to substantially maximize the sum of the detection signals, the present invention is not limited this, and the polarization controller 1 may be controlled so as to substantially maximize or minimize the difference between the detection signals.

Figure 18:
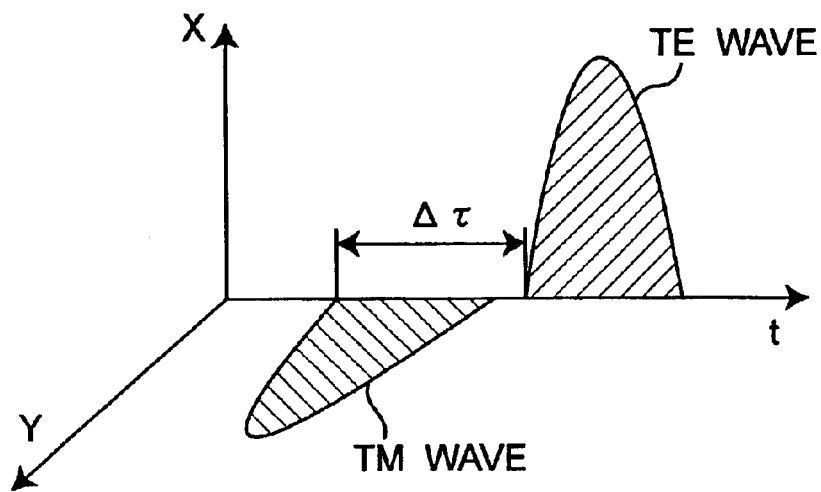
FIG. 18 is a timing chart showing a time waveform of two optical signals of TE and TM waves perpendicular to each other, when a polarization mode dispersion (PMD) is given to an optical signal and the optical signal is then split into the two optical signals of TE and TM waves.

Detailed description is hereinafter given of control operation of the calculator circuit 113 and the controller 114. First of all, when a signal waveform changing with a lapse of time t of an optical signal before having waveform distortion is regarded as F(t), and there is given PMD having a group delay time difference Δτ and a light intensity splitting ratio γ, a signal waveform of the optical signal in the case of being split into a TM wave and a TE wave as shown in FIG. 18 can be expressed by the following equation:

$$\gamma F(t-\Delta\tau)+(1-\gamma)F(t) \qquad (2).$$

Figure 19:
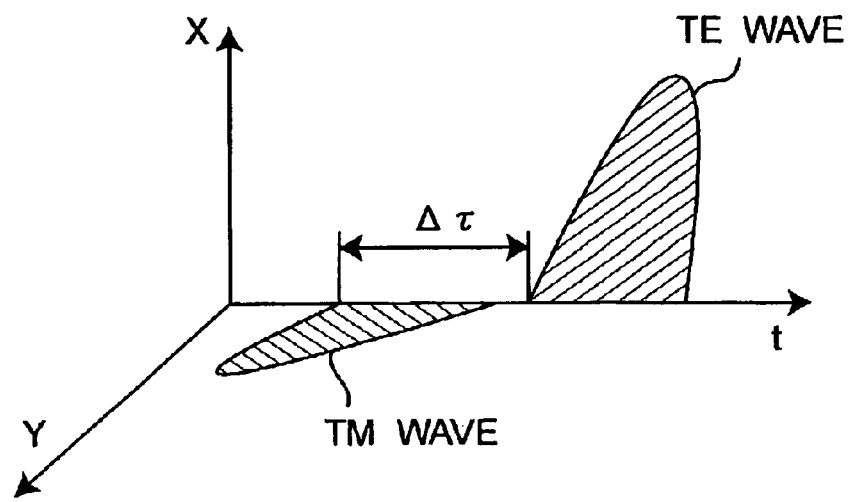
FIG. 19 is a timing chart showing a time waveform of an optical signal whose plane of polarization is inclined.

Next, when polarization split is performed by a polarization splitter and combiner 3 in such a general case as a polarization plane of each polarized wave being inclined (or in the case of elliptical polarization) as shown in FIG. 19, a signal waveform of an optical signal of each polarized wave can be expressed by the following equation:

for TM wave: $(1-\beta)\gamma F(t-\Delta\tau)+\beta(1-\gamma)F(t)$ (3)

and for TE wave: $\beta\gamma F(t-\Delta\tau)+(1-\beta)(1-\gamma)F(t)$ (4), where β is a light intensity splitting ratio, and when the light intensity splitting ratio β is equal to 0 or 1, there is shown an optimum polarization state, in which each polarized wave is in parallel to the vertical direction or the horizontal direction as shown in FIG. 18. Therefore, in order to optimally control the polarization controller 1, it is necessary to detect the light intensity splitting ratio β and to control the light intensity splitting ratio β to be equal to 0 or 1. In the preferred embodiment shown in FIG. 16, when the respective polarized waves are received by the optical signal monitors 111 and 112, respectively, the spectrum component of the baseband signal can be expressed as Fourier transform of the optical signal by the following equations:

for Fourier transform of TM wave:

$$P_{TM}(f) = \left| \int \{(1-\beta)\gamma F(t-\Delta\tau) + \beta(1-\gamma)F(t)\}\exp(i\omega t)dt \right|^2, \quad (5)$$

$$= K_{TM}(f) \left| \int F(t)\exp(i\omega t)dt \right|^2$$

and
for Fourier transform of TE wave:

$$P_{TE}(f) = \left| \int \{\beta\gamma F(t-\Delta\tau) + (1-\beta)(1-\gamma)F(t)\}\exp(i\omega t)dt \right|^2, \quad (6)$$

$$= K_{TE}(f) \left| \int F(t)\exp(i\omega t)dt \right|^2$$

where proportional coefficients $K_{TM}(f)$ and $K_{TE}(f)$ can be expressed by the following equations, respectively, where $\omega=2\pi f$:

$K_{TM}(f)=(\gamma-\beta)^2+4\beta\gamma(1-\beta)(1-\gamma)\cos^2(\pi f\Delta\tau)$ (7)

and $K_{TE}(f)=1-2\beta-2\gamma+(\beta+\gamma)^2+4\beta\gamma(1-\beta)(1-\gamma)\cos^2(\pi f\Delta\tau)$ (8), where the sum of and the difference between proportional coefficients $K_{TM}(f)$ and $K_{TE}(f)$ can be expressed by the following equations, respectively:

$K_{TE}(f)+K_{TM}(f)=1+2\beta(\beta-1)+2\gamma(\gamma-1)+8\beta\gamma(1-\beta)(1-\gamma)\cos^2(\pi f\Delta\tau)$ (9), and $K_{TE}(f)-K_{TM}(f)=(1-2\beta)(1-2\gamma)$ (10).

Figure 20:
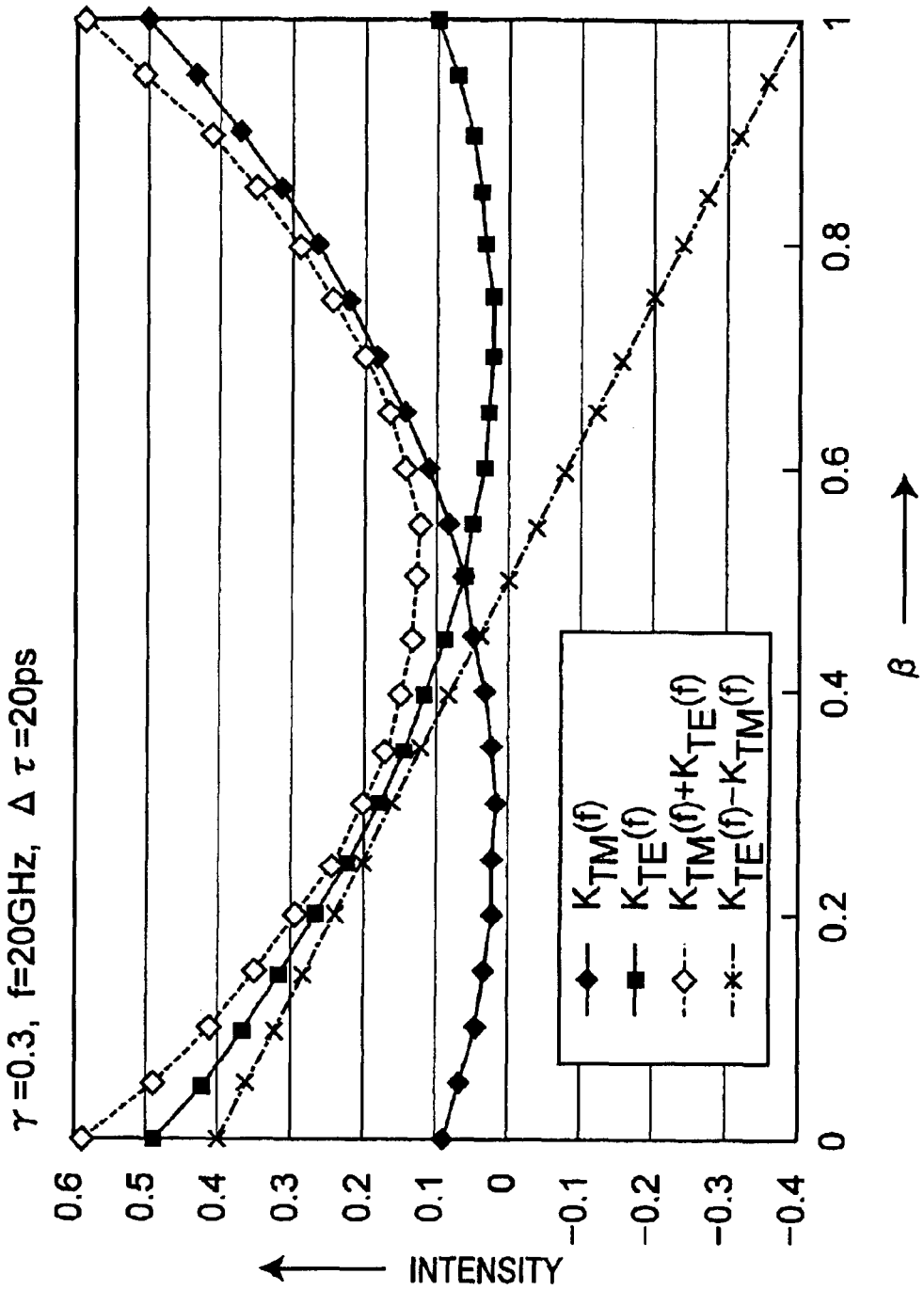
FIG. 20 is a graph showing optical signal intensities of proportional coefficients $K_{TE}(f)$ and $K_{TM}(f)$ each representing a level of waveform distortion with respect to a light intensity splitting ratio β of the polarization controller 1 in baseband spectrum components of TE and TM waves of an optical signal, as well as optical light intensities of the sum of and the difference between the proportional coefficients $K_{TE}(f)$ and $K_{TM}(f)$.

FIG. 20 is a graph showing results of calculating the values of the Equations (7) to (10) as functions of the light intensity splitting ratio β. As is apparent from FIG. 20, controlling the polarization controller 1 so as to substantially maximize the sum of proportional coefficients: $(K_{TE}(f)+K_{TM}(f))$ or to substantially maximize the difference between the proportional coefficients: $(K_{TE}(f)-K_{TM}(f))$ (the latter case is referred to as a modified preferred embodiment) makes it possible to set the light intensity splitting ratio β to 0 or 1, and this leads to enabling the polarization controller 1 to optimally control the polarization state of optical signals. This makes it possible, for example, to minimize the waveform distortion of the optical signals.

In this case, the proportional coefficient $K_{TE}(f)$, which is proportional to the detection signal outputted from the optical signal monitor 112, exhibits the magnitude of waveform distortion of the polarization-split TE wave. Consequently, the sum of the proportional coefficients: $(K_{TE}(f)+K_{TM}(f))$ is proportional to the control signal outputted from the calculator circuit 113, so that controlling the polarization controller 1 so as to substantially maximize the control signal makes it possible to optimally control the polarization state of the optical signal. It is noted that in the modified preferred embodiment, a control signal proportional to the difference between the proportional coefficients: $(K_{TE}(f)-K_{TM}(f))$ may be outputted from the calculator circuit 113, so that controlling the polarization controller 1 so as to substantially maximize or minimize the control signal makes it possible to optimally control the polarization state of the optical signal.

As described above, when the polarization controller 1 is controlled so as to substantially maximize the control signal from the calculator circuit 113, the polarization controller 1 is in the state of being optimally controlled, where respective polarized wave components are ideally polarization-split by the polarization splitter and combiner 3 as shown in FIG. 21. If the polarization controller 1 is not optimally controlled, respective polarized wave signals after being polarization-split by the polarization splitter and combiner 3 have distorted signal waveforms as shown in FIG. 22. Therefore, the optimal control of the polarization controller 1 is achieved by detecting the waveform distortion as shown above. It is noted that FIG. 21 to FIG. 23 are timing charts showing one example, different from the example of FIGS. 18 and 19, in which a TE wave precedes a TM wave. Even if respective polarized wave components of the optical signal are optimally polarization-split by the polarization splitter and combiner 3, the optical signal intensity of either the TM wave or the TE wave may become extremely small or substantially zero as shown in FIG. 23. Eventually, in the structure of monitoring either one of respective polarized waves, the normal control may not be performed or the error may increase. Accordingly, in the present preferred embodiment, information as to waveform distortions of both polarized wave components is detected, and the calculation processing of the information is executed by the calculator circuit 113.

Although in the above-mentioned preferred embodiment, the signal indicating the magnitude of waveform distortion is detected by using the optical signal outputted from each of the optical fiber cables 4 and 5 each having the chirped grating, the present invention is not limited this. A first optical coupler may be provided between the port P12 of the polarization splitter and combiner 3 and the chirped grating of the optical fiber cable 4 so as to detect an optical signal coming to the chirped grating or an optical signal going out from the chirped grating, while a second optical coupler may be provided between the port P13 of the polarization splitter and combiner 3 and the chirped grating of the optical fiber cable 5 so as to detect an optical signal coming to the chirped grating or an optical signal going out from the chirped grating, and these two detected optical signals may be respectively inputted to the optical signal monitors 111 and 112, this leading to generation of the control signal from the calculator circuit 113. It is noted that, if the optical signal is completely reflected by the chirped grating of each of the optical fiber cables 4 and 5, the transmitted light can not be used, and therefore, it is necessary to use the first and second optical couplers. Usually, however, an optical signal of a few percent or more transmits through the chirped gratings, which enables application of the constitution shown in FIG. 16.

Next, the control of the center wavelength by the controller 116 will be described hereinbelow. Referring to FIG.

16, the optical signal outputted from the port P3 of the optical circulator 2 is outputted to an optical fiber cable 94a via a port T1 of the optical directional coupler 120, the optical waveguide path 121 and a port T3. The optical directional coupler 120 has four ports T1, T2, T3 and T4, and the optical directional coupler 120 further includes two optical waveguide paths 121 and 122 that are optically coupled to each other with a predetermined coupling ratio. In the optical directional coupler 120, while the port T2 for detecting an optical signal of a reflected wave from the port T3 to the port T1 is terminated with no reflection, the port T4 for detecting an optical signal of a traveling wave from the port T1 to the port T3 detects an optical signal from the optical circulator 2, and the detected signal is outputted to the optical signal monitor 115. The optical signal monitor 115 has the same constitution and operation as those of each of the optical signal monitors 111 and 112. After photoelectrically converting an inputted optical signal into an electric signal, the optical signal monitor 115 detects a signal power of a predetermined spectrum component out of the baseband signal, and outputs a detection signal indicating the result of detection (a signal indicating magnitude of waveform distortion as described above) to the controller 116. In response to this, the controller 116 controls a group delay time difference by using the center wavelength control units 41 and 51 by adjusting the center wavelength of the chirped grating so as to substantially maximize the inputted detection signal. As a result, for example, the PMD of an optical transmission line such as optical fiber cables may be compensated so as to be substantially zero.

According to the present preferred embodiment as described above, in addition to the action and advantageous effects according to the first preferred embodiment, controlling the polarization controller 1 by the controller 114 based on the control signal from the calculator circuit 113 makes it possible to optimally control the polarization state of the optical signal, and controlling the group delay time difference by the center wavelength control units 41 and 51 via the controller 116 based on the detection signal obtained from the optical directional coupler 120 via the optical signal monitor 115 enables such a compensation that the PMD of the optical transmission lines such as optical fiber cables becomes, for example, substantially zero. Therefore, the control processing of the polarization controller 1 and the control processing of the chirped gratings of the center wavelength control units 41 and 51 may be independently performed by monitoring different separate optical signals, which enables reliable and high-speed execution of each control processing as compared with the first preferred embodiment.

In the above-mentioned preferred embodiment, there are provided a first constitution including the optical signal monitors 111 and 112 to the controller 114, and a second constitution including the optical directional coupler 120 to the controller 116. However, the present invention is not limited this, and there may be provided either one of the first and second constitutions.

Although the optical signal monitors 111, 112 and 115 are used in the above-mentioned preferred embodiment, the present invention is not limited this, and allows use of a degree of polarization monitor. As already known to those skilled in the art, the degree of polarization monitor is capable of measuring the degree of polarization, that is, the amount of degree of polarization from the linearly polarized wave (i.e., an amount of degree to the elliptically polarized wave), so that the magnitude of waveform distortion of the optical signal may be measured, and the detection signal indicating the magnitude thereof can be outputted. It is noted that with the degree of polarization monitor being used, the optical signal may be unmodulated.

In the above-mentioned preferred embodiment, each of the optical fiber cables 4 and 5 have chirped grating. However, the present invention is not limited to this, and each of the optical fiber cables 4 and 5 may have a uniform pitch grating having a uniform grating period.

Sixth Preferred Embodiment

Figure 24:
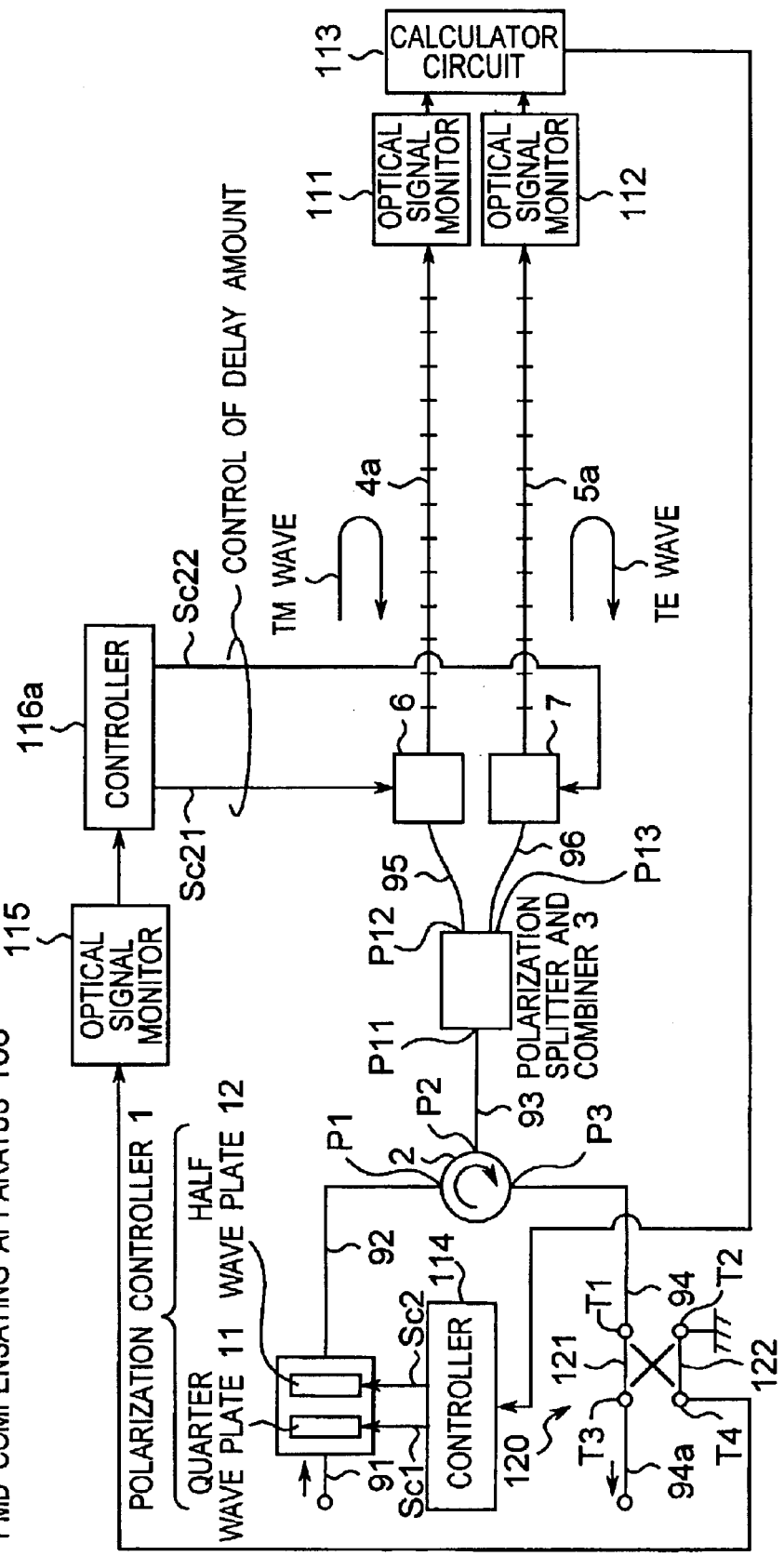
FIG. 24 is a block diagram showing a configuration of a PMD compensating apparatus 106 of a sixth preferred embodiment according to the present invention.

FIG. 24 is a block diagram showing a configuration of a PMD compensating apparatus 106 of a sixth preferred embodiment according to the present invention. As shown in FIG. 24, the PMD compensating apparatus 106 of the sixth preferred embodiment is different from the PMD compensating apparatus 105 of the fifth preferred embodiment shown in FIG. 16 in that a controller 116a for controlling the optical delay controllers 6 and 7 shown in FIG. 4 is provided instead of the controller 116. The differences will be described hereinbelow.

In the present preferred embodiment, after the optical directional coupler 120 detects a part of the output signal from the PMD compensating apparatus 106, the optical signal monitor 115 detects a signal power of a predetermined spectrum component of a baseband signal thereof. Based on the detection signal indicating a result of the detection thereof, the controller 116a adjusts the optical delay amount of each of the optical delay controllers 6 and 7 to substantially maximize the detection signal, so as to control the group delay time difference. More specifically, as shown in the second preferred embodiment, changing the optical delay amount of each of the optical delay controllers 6 and 7 enables control of the PMD of the optical signal inputted to the transportation line 102, and this leads to achievement of such a compensation that the PMD becomes substantially zero.

According to the present preferred embodiment as described above, in addition to the action and advantageous effects according to the second preferred embodiment, controlling the polarization controller 1 by the controller 114 based on the control signal from the calculator circuit 113 makes it possible to optimally control the polarization state of an optical signal, and controlling the group delay time difference by adjusting the optical delay amount by the optical delay controllers 6 and 7 via the controller 116a based on the detection signal obtained from the optical directional coupler 120 via the optical signal monitor 115 enables such a compensation that the PMD of optical transmission lines such as optical fiber cables becomes, for example, substantially zero. Therefore, the control processing of the polarization controller 1 and the control processing of the chirped gratings in the center wavelength control units 41 and 51 can be independently performed by monitoring different separate optical signals, which enables reliable and high-speed execution of each control processing as compared with the second preferred embodiment.

In the above-mentioned preferred embodiment, there are provided the optical delay controllers 6 and 7 on the both TM wave side and TE wave side, each of which controls the optical delay amount of the both TM wave and TE wave. However, the present invention is not limited to this, and the optical delay controller may be provided in at least one of the TM wave side and the TE wave side.

In the above-mentioned preferred embodiment, each of the optical fiber cables 4a and 5a have a uniform pitch grating. However, the present invention is not limited to this, and each of the optical fiber cables 4a and 5a may have a chirped grating.

Seventh Preferred Embodiment

Figure 25:
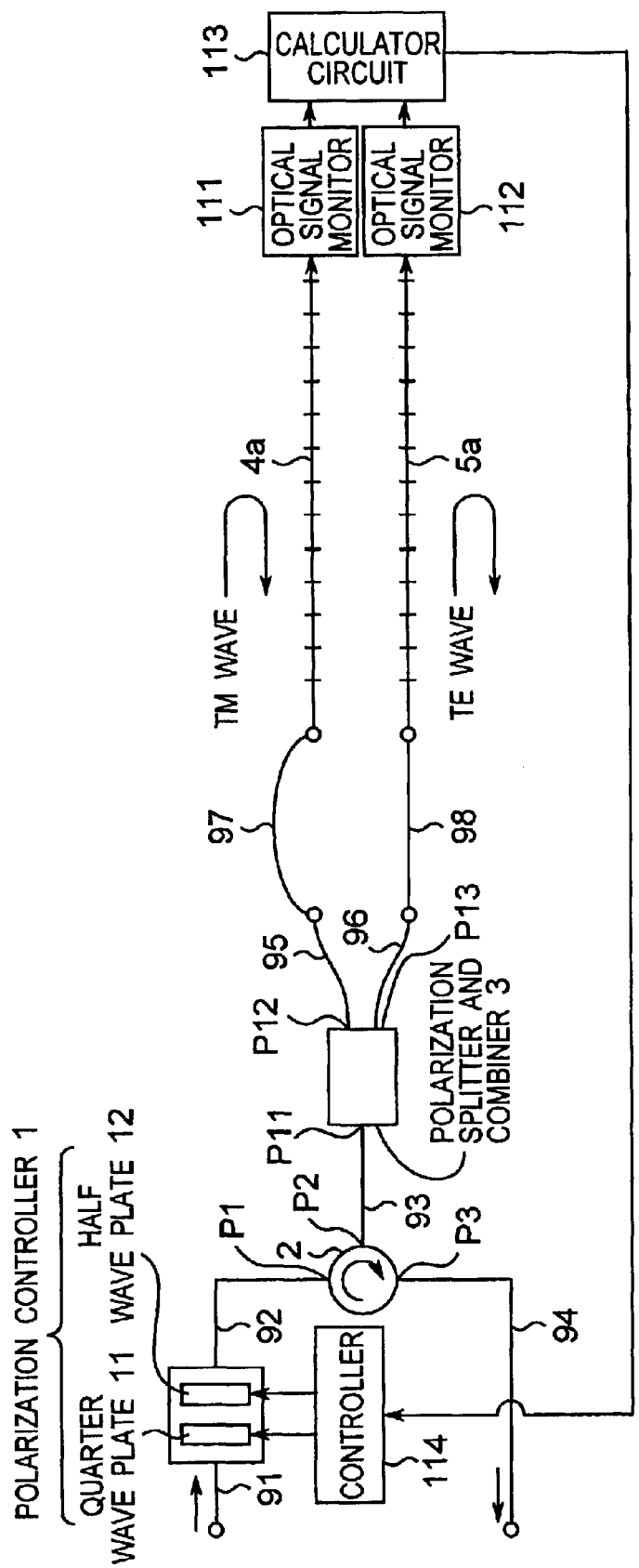
FIG. 25 is a block diagram showing a configuration of a PMD compensating apparatus 107 of a seventh preferred embodiment according to the present invention.

FIG. 25 is a block diagram showing a configuration of a PMD compensating apparatus 107 of a seventh preferred embodiment according to the present invention. As shown in FIG. 25, the PMD compensating apparatus 107 of the seventh preferred embodiment is different from the PMD compensating apparatus 102a of the implemental example of the second preferred embodiment shown in FIG. 7 at the following points:

(a) there are further provided optical signal monitors 111 and 112, a calculator circuit 113, and a controller 114; and (b) an optical signal inputted to the polarization controller 1 is intensity-modulated by the transmission side according to a predetermined digital data signal by using a predetermined clock signal.

In the PMD compensating apparatus 107 constituted as described above, the optical signal monitors 111 and 112, the calculator circuit 113, and the controller 114 operate in the same manner as those of the PMD compensating apparatus 105 shown in FIG. 16. According to the present preferred embodiment, therefore, in addition to the action and advantageous effects according to the modified preferred embodiment of the second preferred embodiment, the controlling the polarization controller 1 by the controller 114 based on the control signal from the calculator circuit 113 makes it possible to optimally control the polarization state of the optical signal. This leads to, for example, minimization of waveform distortion of the optical signal.

In the above-mentioned preferred embodiment, each of the optical fiber cables 4a and 5a has the uniform pitch grating. However, the present invention is not limited to this, and each of the optical fiber cables 4a and 5a may have a chirped grating.

Eighth Preferred Embodiment

Figure 26:
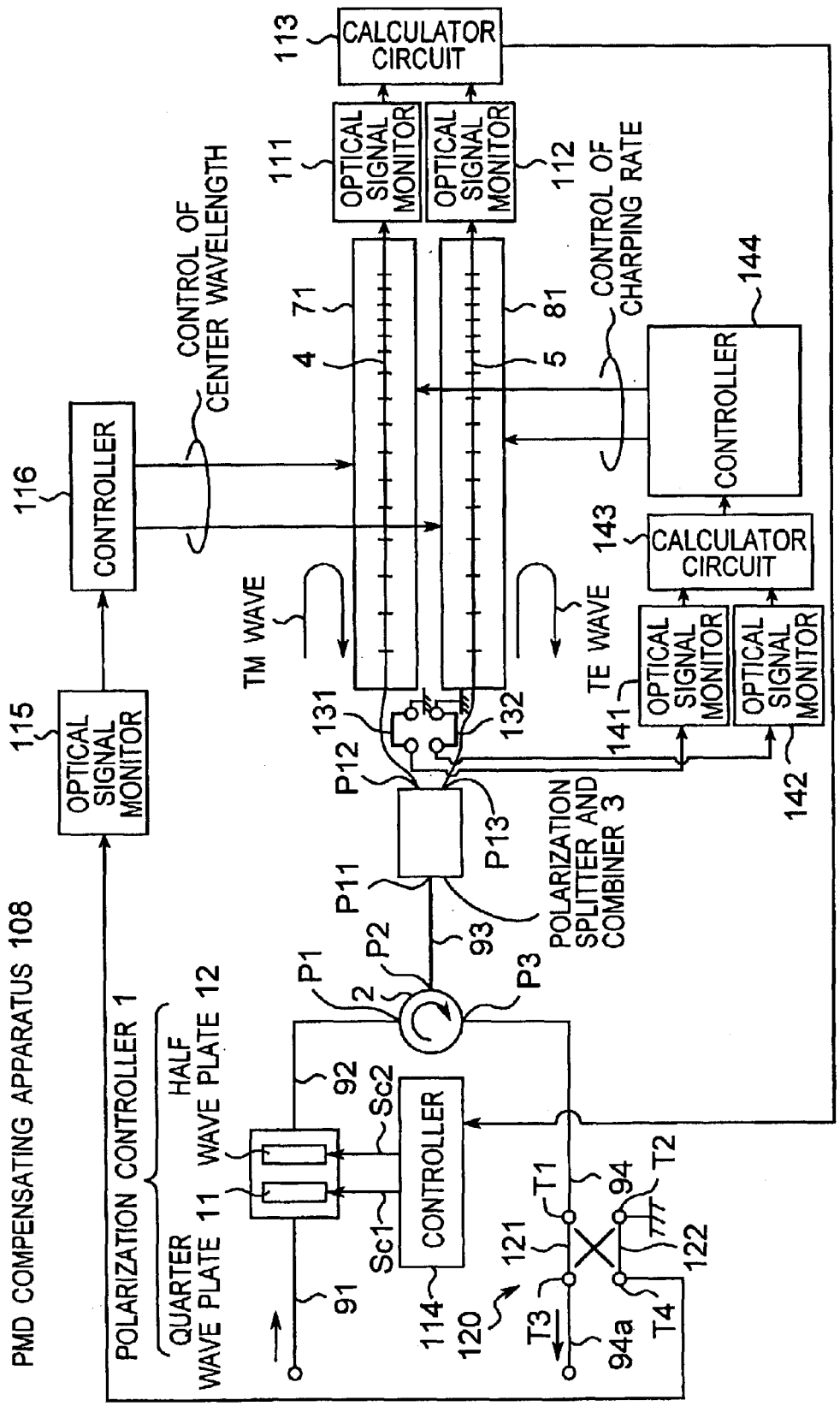
FIG. 26 is a block diagram showing a configuration of a PMD compensating apparatus 108 of an eighth preferred embodiment according to the present invention.

FIG. 26 is a block diagram showing a configuration of a PMD compensating apparatus 108 of an eighth preferred embodiment according to the present invention. As shown in FIG. 26, the PMD compensating apparatus 108 of the eighth preferred embodiment is different from the PMD compensating apparatus 105 of the fifth preferred embodiment shown in FIG. 16 at the following points:

(a) the controller 116 outputs a control signal for controlling the center wavelength to the center-wavelength and chirping-rate control units 71 and 81; and (b) there are further provided optical couplers 131 and 132, optical signal monitors 141 and 142, a calculator circuit 143, and a controller 144.

In the PMD compensating apparatus 108 constituted as described above, the controller 116 controls the center-wavelength and chirping-rate control units 71 and 81 so as to independently adjust the center wavelengths of the chirped gratings of each of the optical fiber cables 4 and 5 so that the detection signal inputted from the optical signal monitor 115 becomes substantially the maximum, and this leads to achievement of control of the group delay time difference. This enables such a compensation that the PMD of optical transmission lines such as optical fiber cables becomes, for example, substantially zero.

Also, an optical coupler 131 is provided between the port P12 of the polarization splitter and combiner 3 and the optical fiber cable 4 having a chirped grating, while an optical coupler 132 is provided between the port P13 of the polarization splitter and combiner 3 and the optical fiber cable 5 having a chirped grating. The optical coupler 131 detects an optical signal of a TM wave reflected by the optical fiber cable 4 having a chirped grating, and outputs a detection signal thereof to the optical signal monitor 141. The optical signal monitor 141 has the same constitution and operation as those of the optical signal monitors 111 and 112 of FIG. 17. After photoelectrically converting an inputted optical signal into an electric signal, the optical signal monitor 141 detects a signal power of a predetermined spectrum component out of the baseband signal, and outputs a detection signal indicating the result of detection thereof (which is a signal indicating the magnitude of waveform distortion as described above) to the calculator circuit 143. On the other hand, the optical coupler 132 detects an optical signal of a TM wave reflected by the optical fiber cable 5 having a chirped grating, and outputs a detection signal thereof to the optical signal monitor 142. The optical signal monitor 142 has the same constitution and operation as those of the optical signal monitors 111 and 112 of FIG. 17. After photoelectrically converting an inputted optical signal into an electric signal, the optical signal monitor 142 detects a signal power of a predetermined spectrum component out of the baseband signal, and outputs a detection signal indicating the result of detection thereof (which is a signal indicating magnitude of waveform distortion as described above) to the calculator circuit 143.

Next, the calculator circuit 143 calculates the sum of these two inputted detection signals, and outputs an output signal indicating a result of calculation to the controller 144. In response to this, the controller 144 controls the center-wavelength and chirping-rate control units 71 and 81 so as to adjust the chirping rates of the chirped gratings of each of the optical fiber cables 4 and 5 in the same manner so that an output signal from the calculator circuit 143 becomes substantially the maximum. In this case, the output signal from the calculation circuit 14 has information as to the waveform distortion of the optical signal. When the output signal becomes the maximum, the waveform distortion of the optical signal is substantially minimized. Such a state is the state where chirping rate control sections of the center-wavelength and chirping-rate control units 71 and 81 are ideally controlled, in which an optimum wavelength dispersion can be obtained. The signal that thus detected the power level of the spectrum component of the baseband signal from each of the optical signals that are polarization-slit and reflected by the chirped gratings does not contain information as to waveform distortion due to the PMD. Therefore, the use of the signal as the control signal enables reliable and high-speed control of wavelength dispersion.

According to the preferred embodiment having the constitution as described above, in addition to the action and advantageous effects according to the fifth preferred embodiment, there can be obtained such a unique advantageous effect that reliable and high-speed control of wavelength dispersion may be performed by controlling the chirping rate control sections of the center-wavelength and chirping-rate control units 71 and 81, in a manner similar to each other, by the controller 144 based on the output signal from the calculator circuit 143 so as to substantially maximize the output signal.

In the above-mentioned preferred embodiment, each of the optical fiber cables 4 and 5 has the chirped grating. However, the present invention is not limited to this, and each of the optical fiber cables 4 and 5 may have a uniform pitch grating.

Ninth Preferred Embodiment

Figure 27:
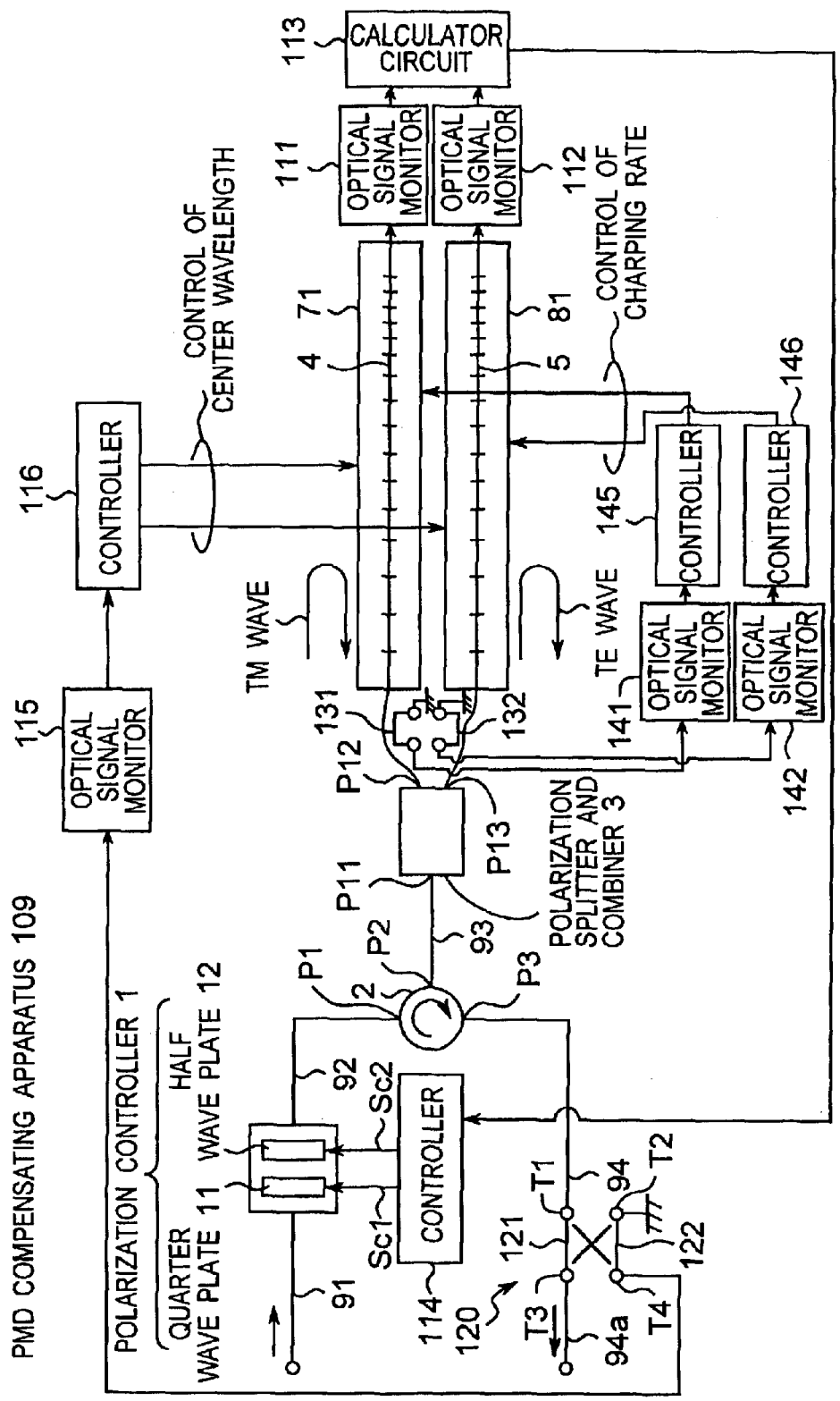
FIG. 27 is a block diagram showing a configuration of a PMD compensating apparatus 109 of a ninth preferred embodiment according to the present invention.
Figure 28:
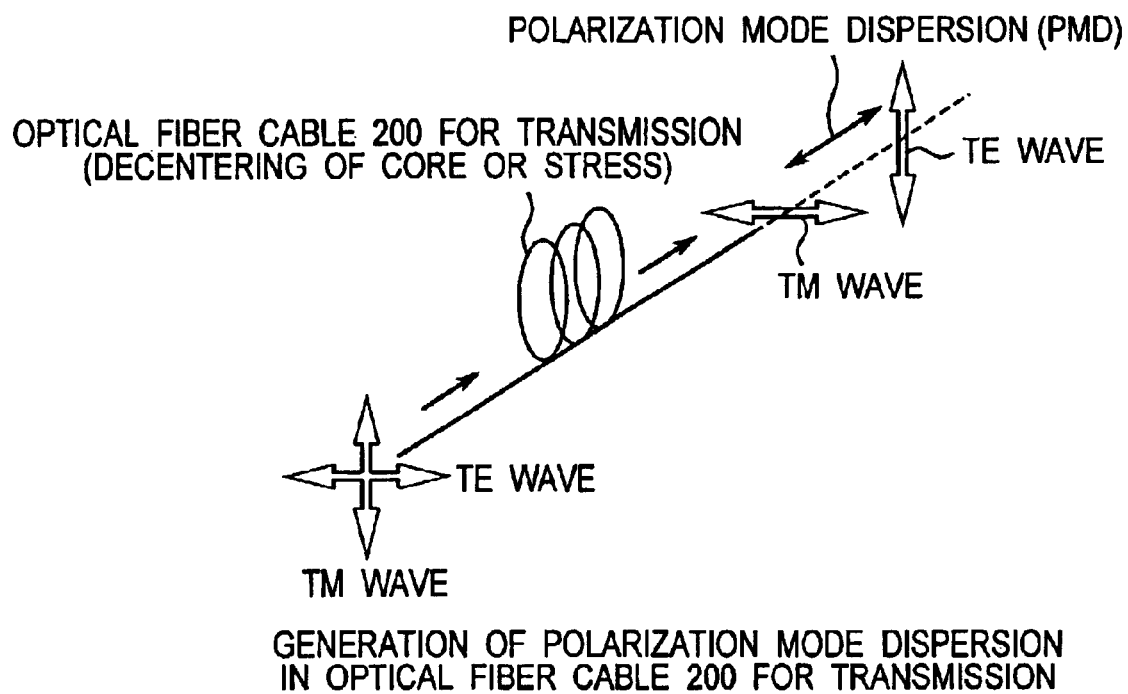
FIG. 28 is a perspective view showing generation of polarization mode dispersion in an optical fiber cable 200 for transmission according to a prior art.

FIG. 27 is a block diagram showing a configuration of a PMD compensating apparatus 109 of a ninth preferred embodiment according to the present invention. As shown in FIG. 27, the PMD compensating apparatus 109 of the ninth preferred embodiment is different from the PMD compensating apparatus 108 of the eighth preferred embodiment shown in FIG. 26 at the following point:

(a) Instead of the calculator circuit 143 and the controller 144, controllers 145 and 146 are provided.

In the PMD compensating apparatus 109 having the constitution as described above, a part of each optical signal reflected by the chirped gratings of each of the optical fiber cables 4 and 5 is respectively split by optical couplers 131 and 132, and then, the partial optical signal is photoelectrically converted into an electric signal by each of the optical signal monitors 141 and 142. Then, each detection signal for detecting and indicating a signal power of a predetermined spectrum component out of the baseband signal (which is a signal indicating the magnitude of waveform distortion as described above) is outputted to the controllers 145 and 146, respectively. Next, the controllers 145 and 146 control the chirping rate control sections of the center-wavelength and chirping-rate control units 71 and 81, respectively, in a manner independent of each other so as to maximize the respective detection signals. In the eighth preferred embodiment shown in FIG. 25, each chirping rate control section of the center-wavelength and chirping-rate control units 71 and 81 is controlled in a manner similar to that of each other for controlling wavelength dispersion. However, in the present preferred embodiment, each chirping rate control section of the center-wavelength and chirping-rate control units 71 and 81 is controlled in a manner different from each other, like the fourth preferred embodiment, for the purpose of providing the wavelength dependence of PMD. The detection signal from each of the optical signal monitors 141 and 142 has information as to the magnitude of waveform distortion of an optical signal. When the output signals become the maximum, the waveform distortion of the optical signal is substantially minimized. Such a state is the state where each chirping rate control section of the center-wavelength and chirping-rate control units 71 and 81 is ideally controlled, in which an optimum PMD depending on the wavelength can be obtained. It is noted that the wavelength dependence of the PMD is equivalent to polarization dependence of the wavelength dispersion, and therefore, controlling the wavelength dependence of the PMD by controlling each chirping rate control section of the center-wavelength and chirping-rate control units 71 and 81 so as to be different from each other as described above is equivalent to giving different wavelength dispersions to each polarized wave.

According to the preferred embodiment having the constitution described above, in addition to the action and advantageous effects of the fifth preferred embodiment, there can be obtained such a unique advantageous effect that reliable and high-speed control of the wavelength dependence of the PMD, more specifically, an equivalent polarization dependence of the wavelength dispersion, can be performed by independently controlling the chirping rate control sections of the center-wavelength and chirping-rate control units 71 and 81 by the controllers 145 and 146 so as to substantially maximize respective detection signals in a manner independent of each other, based on the detention signals from the optical signal monitors 141 and 142.

In the above-mentioned preferred embodiment, each of the optical fiber cables 4 and 5 has the chirped grating. However, the present invention is not limited to this, and each of the optical fiber cables 4 and 5 may have a uniform pitch grating.

Modified Preferred Embodiments

In the above-mentioned preferred embodiments, the optical fiber cables 4 and 5, 4a, 5a and 91 to 98 are used. However, the present invention is not limited to this, and instead of these, there can be utilized various kinds of optical transmission lines, for example, an optical waveguide path which is made through the steps of forming a quartz film as an undercladding by CVD process on a silicon substrate that serves as an optical waveguide path substrate, then forming a core by doping the quartz film with predetermined impurities, and thereafter forming an overcladding thereon.

In the above-mentioned preferred embodiments, when optical signals of the TM and TE waves, which are linear polarizations outputted from the polarization splitter and combiner 3, are inputted once more to the polarization splitter and combiner 3 by being reflected by the chirped gratings or uniform pitch gratings of the optical fiber cables 4 and 5 or 4a and 5a, respectively, if their linearly polarized state is held, the optical signals are outputted as they are combined together, however, if their polarization state is collapsed with the result of a rotated polarization axis or elliptically polarized waves or the like, the optical signals would not be combined successfully, resulting in increase in the loss. In order to prevent this, it is necessary to use polarization-holding optical fiber cables. With this measure, the TM and TE waves outputted from the polarization splitter and combiner 3 keep their polarization state while being reflected by the chirped gratings or uniform pitch gratings, and thereafter, combined together and outputted by the polarization splitter and combiner 3. In this case, it is preferable that not only optical fiber cables for connection use but also the optical fiber cables 4 and 5 or 4a and 5a each having a chirped grating or a uniform pitch grating are implemented by polarization-holding optical fiber cables. However, in the case where the optical fiber cables for connection use are arranged in a curved shape, the optical signals are indeed collapsed once, but after passing through a path of the same curved shape once more after reflection by the chirped gratings or uniform pitch gratings, restore their original linearly polarized state as they are inputted to the polarization splitter and combiner 3. As a result, the optical signals of the TM and TE waves, which are their respective linear polarizations, are combined together and outputted as such without any loss. Accordingly, it may be the case that it is not always necessary to use the polarization-holding optical fiber cables.

As mentioned above in detail, according to the preferred embodiments of the present invention, the polarization control means can be certainly at a higher speed, as compared with the prior art.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A polarization mode dispersion compensating apparatus comprising:

polarization control means for controlling polarization state of an optical signal so that a polarization axis of the optical signal becomes substantially coincident with an optical axis of an optical transmission line;

polarization splitting and combining means having first, second, and third ports, splitting an optical signal output from said polarization control means and input via the first port, into first and second optical signals having respective polarized wave components substantially perpendicular to each other, and outputting the first and second optical signals, respectively, via the second and third ports, said polarization splitting and combining means combining optical signals input via the second and third ports, and outputting a combined signal via the first port;

a first optical transmission line coupled to the second port of the polarization splitting and combining means and having a first grating, reflecting a first part of the first optical signal and transmitting a second part of the first optical signal and outputting the first part of the first optical signal to the second port of said polarization splitting and combining means;

a second optical transmission line coupled to the third port of the polarization splitting and combining means and having a second grating reflecting a first part of the second optical signal and transmitting a second part of the second optical signal and outputting the first part of the second optical signal to the third port of said polarization splitting and combining means;

first detection means connected to said first optical transmission line, said first detection means detecting and outputting, based on one of the first and second parts of the first optical signal output from said first optical transmission line, a first detection signal indicating magnitude of waveform distortion of the optical signal input to said first detection means;

second detection means connected to said second optical transmission line, said second detection means detecting and outputting, based on one of the first and second parts of the second optical signal output from said second optical transmission line, a second detection signal indicating magnitude of waveform distortion of the optical signal input to said second detection means;

first calculation means, receiving the first detection signal and the second detection signal individually, for calculating, based on the first detection signal and the second detection signal, and outputting an output signal; and first control means for controlling said polarization control means based on the output signal output by said first calculation means.

2. The polarization mode dispersion compensating apparatus according to claim 1, wherein said first calculation means calculates a sum of the first detection signal and the second detection signal, and said first control means controls said polarization control means to substantially maximize the sum of the first detection signal and the second detection signal.

3. The polarization mode dispersion compensating apparatus according to claim 1, wherein said first calculation means calculates a difference between the first detection signal and the second detection signal, and said first control means controls said polarization control means to perform one of substantially maximizing and substantially minimizing the difference between the first detection signal and the second detection signal.

4. The polarization mode dispersion compensating apparatus according to claim 1, wherein said first detection means detects and outputs a first detection signal indicating power of a spectral component of a baseband signal of the optical signal input to said first detection means, and the second detection means detects and outputs a second detection signal indicating power of a spectral component of a baseband signal of the optical signal input to said second detection means.

5. The polarization mode dispersion compensating apparatus according to claim 1, further comprising:

third detection means detecting and outputting, based on an optical signal output from the first port of the polarization splitting and combining means, a third detection signal indicating magnitude of waveform distortion of the optical signal input to said third detection means; and second control means provided on at least one of said first transmission line and said second transmission line, said second control means processing an optical signal transmitted on one of said first transmission line and said second transmission line based on the third detection signal, thereby controlling group delay time difference between the optical signals having two polarized wave components substantially perpendicular to each other.

6. The polarization mode dispersion compensating apparatus according to claim 5, wherein said third detection means detects and outputs a third detection signal indicating degree of polarization of the optical signal input to said third detection means.

7. The polarization mode dispersion compensating apparatus according to claim 5, wherein said second control means controls polarization mode dispersion by controlling optical delay of an optical signal transmitted on at least one of said first transmission line and said second transmission line, based on the third detection signal.

8. The polarization mode dispersion compensating apparatus according to claim 5, further comprising third control means for controlling polarization mode dispersion by delaying, by a predetermined optical delay amount, the optical signal transmitted on at least one of said first transmission line and said second transmission line.

9. The polarization mode dispersion compensating apparatus according to claim 5, wherein said second control means controls polarization mode dispersion by controlling a center wavelength of a band component of an optical signal reflected by at least one of said first and second gratings, based on the third detection signal.

10. The polarization mode dispersion compensating apparatus according to claim 9, wherein said second control means comprises at least one of:

(a) means provided in at least one of said first and second gratings, and controlling temperature of at least one of said first and second optical transmission lines, based on the third detection signal;

(b) means provided in at least one of said first and second gratings, and controlling stress applied to at least one of said first and second optical transmission lines, based on the third detection signal; and (c) means provided in at least one of said first and second gratings, and controlling electric field applied to at least one of said first and second optical transmission lines, based on the third detection signal.

11. The polarization mode dispersion compensating apparatus according to claim 9, wherein said second control means comprises at least one of:

(a) means provided in at least one of said first and second gratings, and controlling distribution of temperature of at least one of said first and second optical transmission lines, in longitudinal directions of said first and second gratings, based on the third detection signal;

(b) means provided in at least one of said first and second gratings, and controlling distribution of stress applied to at least one of said first and second optical transmission lines in longitudinal directions of said first and second gratings, based on the third detection signal; and (c) means provided in at least one of said first and second gratings, and controlling distribution of electric field applied to at least one of said first and second optical transmission lines, in longitudinal directions of said first and second gratings, based on the third detection signal.

12. The polarization mode dispersion compensating apparatus according to claim 11, wherein said second control means controls an average value of one of the temperature distribution, the stress distribution, and the electric field distribution, based on the third detection signal, to control the center wavelength of the band component of the optical signal reflected by at least one of said first and second gratings, thereby controlling the polarization mode dispersion.

13. The polarization mode dispersion compensating apparatus according to claim 1, further comprising:
third detection means connected to said first optical transmission line, and detecting and outputting, based on an optical signal reflected from said first optical transmission line, a third detection signal indicating magnitude of waveform distortion of the optical signal input to said third detection means;
fourth detection means connected to said second optical transmission line, and detecting and outputting, based on an optical signal reflected from said second optical transmission line, a fourth detection signal indicating magnitude of waveform distortion of the optical signal input to said fourth detection means;
second calculation means for calculating one of a sum of and a difference between the third detection signal and the fourth detection signal, and outputting an output signal indicating results of the calculating; and
second control means for controlling said first control means based on the output signal from said second calculation means, wherein
said first and second gratings are chirped gratings, and said second control means controls a gradient of one of the temperature distribution, the stress distribution, and the electric field distribution, based on the output signal from the second calculation means, thereby controlling chirping rates of said first and second gratings.

14. The polarization mode dispersion compensating apparatus according to claim 1, wherein said first and second gratings are chirped gratings and further comprising:
third detection means connected to said first optical transmission line, and detecting and outputting, based on an optical signal reflected from said first optical transmission line, a third detection signal indicating magnitude of waveform distortion of the optical signal input to said third detection means;
fourth detection means connected to said second optical transmission line, and detecting and outputting, based on an optical signal reflected from said second optical transmission line, a fourth detection signal indicating magnitude of waveform distortion of the optical signal input to said fourth detection means; and
second control means for controlling gradient of one of temperature distribution, stress distribution, and electric field distribution with respect to the first chirped grating based on the third detection signal, and, at the same time, controlling the gradient of one of the temperature distribution, the stress distribution, and the electric field distribution with respect to the second grating based on the fourth detection signal, so that the gradients of one of the temperature distribution, the stress distribution, and the electric field distribution are different from each other between said first and second gratings, to control chirping rates of said first and second gratings, thereby controlling wavelength dependence of the polarization mode dispersion.

15. The polarization mode dispersion compensating apparatus according to claim 5, wherein said second control means controls the polarization mode dispersion by setting center wavelengths of band components of the optical signals respectively reflected by said first and second gratings, based on the third detection signal, so as to be different from each other.

16. The polarization mode dispersion compensating apparatus according to claim 1, further comprising an optical circulator provided between said polarization control means and said polarization splitting and combining means, outputting an optical signal from said polarization control means to said polarization splitting and combining means, and outputting an optical signal from the polarization splitting and combining means via a port, other than a port, connected to said polarization control means.

17. A polarization mode dispersion compensating apparatus comprising:
polarization control means for controlling polarization state of an optical signal so that a polarization axis of the optical signal becomes substantially coincident with an optical axis of an optical transmission line;
polarization splitting and combining means having first, second, and third ports, splitting an optical signal output from said polarization control means and input via the first port, into first and second optical signals having respective polarized wave components substantially perpendicular to each other, and outputting the first and second optical signals, respectively, via the second and third ports, said polarization splitting and combining means combining optical signals input via the second and third ports, and outputting a combined signal via the first port;
a first optical transmission line coupled to the second port of the polarization splitting and combining means and having a first grating, reflecting a first part of the first optical signal and transmitting a second part of the first optical signal and outputting the first part of the first optical signal to the second port of said polarization splitting and combining means;
a second optical transmission line coupled to the third port of the polarization splitting and combining means and having a second grating reflecting a first part of the second optical signal and transmitting a second part of the second optical signal and outputting the first part of the second optical signal to the third port of said polarization splitting and combining means; and
control means provided on at least one of said first transmission line and said logical second transmission line, and controlling group delay time difference between the first and second optical signals having the respective polarized wave components substantially perpendicular to each other by processing an optical signal transmitted on at least one of said first optical transmission line and said second optical transmission line, wherein said control means comprises at least one of:

(a) means provided in at least one of said first and second gratings, and controlling a non-uniform distribution of temperature of at least one of said first and second optical transmission lines, in longitudinal directions of said first and second gratings;

(b) means provided in at least one of said first and second gratings, and controlling a non-uniform distribution of stress applied to at least one of said first and second optical transmission lines in the longitudinal directions of said first and second gratings; and (c) means provided in at least one of said first and second gratings, and controlling a non-uniform distribution of electric field applied to at least one of said first and second optical transmission lines in the longitudinal directions of said first and second gratings.

18. The polarization mode dispersion compensating apparatus according to claim 17, wherein said control means controls gradient of one of the temperature distribution, the stress distribution, and the electric field distribution, thereby controlling the group delay time difference between wavelengths of the optical signal reflected by at least one of said first and second gratings.

19. The polarization mode dispersion compensating apparatus according to claim 18, wherein said first and second gratings are chirped gratings, and said control means controls the gradient of one of the temperature distribution, the stress distribution, and the electric field distribution, thereby controlling chirping rates of said first and gratings.

20. The polarization mode dispersion compensating apparatus according to claim 19, wherein said control means controls the gradient of one of the temperature distribution, the stress distribution, and the electric field distribution so that the gradients are different from each other between said first and second gratings, to control chirping rates of said first and second gratings, thereby controlling wavelength dependence of the polarization mode dispersion.

* * * * *